(12) United States Patent
Rune et al.

(10) Patent No.: US 11,197,259 B2
(45) Date of Patent: *Dec. 7, 2021

(54) COORDINATION OF SIMULTANEOUS MULTI-RAT CAMPING

(71) Applicant: Telefonaktiebolaget LM Ericsson (publ), Stockholm (SE)

(72) Inventors: Johan Rune, Lidingö (SE); Icaro L. J. Da Silva, Solna (SE); Gunnar Mildh, Sollentuna (SE); Jose Luis Pradas, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/036,748

(22) Filed: Sep. 29, 2020

(65) Prior Publication Data

US 2021/0029661 A1 Jan. 28, 2021

Related U.S. Application Data

(63) Continuation of application No. 16/665,322, filed on Oct. 28, 2019, now Pat. No. 10,805,896, which is a
(Continued)

(51) Int. Cl.
*H04W 60/00* (2009.01)
*H04W 60/04* (2009.01)
(Continued)

(52) U.S. Cl.
CPC ......... *H04W 60/005* (2013.01); *H04W 60/04* (2013.01); *H04W 64/00* (2013.01); *H04W 68/06* (2013.01); *H04W 76/15* (2018.02)

(58) Field of Classification Search
CPC ... H04W 60/005; H04W 60/04; H04W 64/00; H04W 68/06
See application file for complete search history.

(56) References Cited

U.S. PATENT DOCUMENTS 8,565,750 B2 10/2013 Fischer
8,606,270 B2 12/2013 Chin et al.
(Continued)

FOREIGN PATENT DOCUMENTS

CN 102857982 A 1/2013
CN 104754695 A 7/2015
(Continued)

OTHER PUBLICATIONS

China Unicom, Analysis on the possible solutions of the joint operation, 3GPP TSG-RAN WG2 MEeting #94, Nanjing, China, May 23-27, 2016, R2-163816.
(Continued)

*Primary Examiner* — Mazda Sabouri
(74) *Attorney, Agent, or Firm* — Coats & Bennett, PLLC

(57) ABSTRACT

The present invention relates to the coordination of simultaneous multi-RAT camping in in a wireless communication network that provides radio access for a terminal device via at least a first and second wireless radio access operating with different radio access technologies. The improved multi-RAT camping is achieved by transmitting, by a network node, an indication regarding a set of camping areas, CAs, including a first set of camping areas being associated with the first RAT and a second set of camping areas being associated with the second RAT; performing, by the terminal device, camping in a coverage area defined based on the set of CAs; and updating, by the terminal device, the communication network with a geographic location of the terminal device a) when the terminal device enters a new coverage area being different from the coverage area defined by both the first and second set of CAs as a first mechanism, or b) when the terminal device enters a new coverage area being different from the coverage area defined by one of the first and second set of CAs as a second mechanism.

21 Claims, 13 Drawing Sheets

Related U.S. Application Data continuation of application No. 16/153,418, filed on Oct. 5, 2018, now Pat. No. 10,462,763, which is a continuation of application No. 15/539,908, filed as application No. PCT/EP2016/067685 on Jul. 25, 2016, now Pat. No. 10,117,212.

(51) Int. Cl.
  *H04W 68/06* (2009.01)
  *H04W 76/15* (2018.01)
  *H04W 64/00* (2009.01)

(56) References Cited

U.S. PATENT DOCUMENTS

| | | |
|---|---|---|
| 9,635,591 B2 | 4/2017 | Jin et al. |
| 2008/0311927 A1 | 12/2008 | Boman et al. |
| 2010/0240356 A1 | 9/2010 | Lee et al. |
| 2012/0195290 A1 | 8/2012 | Bienas et al. |
| 2013/0022022 A1 | 1/2013 | Schmitt |
| 2013/0337850 A1 | 12/2013 | Ljung |
| 2015/0050924 A1 | 2/2015 | Gotou |
| 2015/0156690 A1 | 6/2015 | Futaki |
| 2018/0109977 A1 | 4/2018 | Andrei et al. |

FOREIGN PATENT DOCUMENTS

| | | |
|---|---|---|
| EP | 2713637 A2 | 4/2014 |
| JP | H11341545 A | 12/1999 |
| JP | 2013524666 A | 6/2013 |
| RU | 2452136 C2 | 5/2012 |
| WO | 2013111217 A1 | 8/2013 |
| WO | 2014003846 A1 | 1/2014 |
| WO | 2014155202 A1 | 10/2014 |
| WO | 2015149409 A1 | 10/2015 |

OTHER PUBLICATIONS

Razavi, S. et al., "Dynamic Tracking Area List Configuration and Performance Evaluation in LTE", IEEE Globecom 2010 Workshop on Seamless Wireless Mobility, Dec. 1, 2010, pp. 49-53.

NEC, Pseudo-CR on Solution "Optimal configuration of tracking areas and TAI lists", 3GPP TSG CT WG1 Meeting #67, Oct. 11-15, 2010, C1-104249.

Da Silva, I. et al., "A novel state model for 5G radio access networks", 2016 IEEE International Conference on Communications Workshops (ICC), May 23, 2016, pp. 632-637.

Da Silva, I. et al., "Tight integration of new 5G air interference and LTE to fulfill 5G requirements", 2015 IEEE 81st Vehicular Technology Conference, May 11-14, 2015, pp. 1-5.

Nokia et al., "Pseudo-CR on Coding of the Tracking area identity list information Element", 3GPP TSG CT WG1 Meeting #54, Jun. 23-27, 2008, pp. 1-6, C1-082175.

China Unicom, "Analysis on the possible solutions of the joint operation", 3GPP TSG-RAN WG2 Meeting #94, May 23-27, 2016, pp. 1-3, R2-163816.

GSM Association, "RSP Technical Specification Version 1.0", Official Document SGP.22—RSP Technical Specification, Jan. 13, 2016, pp. 1-114.

3RD Generation Partnership Project, "Technical Specification Group Radio Access Network; Study on Scenarios and Requirements for Next Generation Access Technologies; (Release 14)", 3GPP TR 38.913 V0.3.0, Mar. 2016, pp. 1-30.

NTT Docomo, "New SID Proposal: Study on New Radio Access Technology", 3GPP TSG RAN Meeting #71, Mar. 7-10, 2016, Goöteborg, Sweden, RP-160671.

| | |
|---|---|
| CA-RAT1a | CA-RAT2a |
| CA-RAT1b | CA-RAT2b |
| CA-RAT1c | CA-RAT2c |
| CA-RAT1d | |

COORDINATION OF SIMULTANEOUS MULTI-RAT CAMPING

RELATED APPLICATIONS

The present application is a continuation of U.S. patent application Ser. No. 16/665,322 filed Oct. 28, 2019, which is a continuation of U.S. patent application Ser. No. 16/153,418 filed Oct. 5, 2018, issued as U.S. Pat. No. 10,462,763, which is a continuation of U.S. patent application Ser. No. 15/539,908, filed on Jun. 26, 2017, issued as U.S. Pat. No. 10,117,212, which is a national stage application of PCT/EP2016/067685, filed Jul. 25, 2016, the disclosures of each of which are incorporated herein by reference in their entirety.

TECHNICAL FIELD

The present invention generally relates to wireless communications, and particularly relates a method, a terminal device, a network node, a computer-readable storage medium, a computer program, and a carrier containing the computer program for coordinating mechanisms for simultaneous multi-RAT camping.

BACKGROUND

The requirements of the 5th generation of mobile networks (5G) and the demand for a new 5G air interface are driven by, among others, the handling of massive machine communication (MMC) and the support of low latency (in the order of 1 millisecond) for ultra-reliable communication (URC). In order to fulfil 5G requirements in terms of data rates and latency a new air interface designed to operate at higher frequencies is needed, e.g. above 6 GHz. In comparison to the current frequency bands allocated to LTE, much more challenging propagation conditions exist so that the coverage of the new air interface can be spottier, i.e. more irregular. The extensive use of beamforming, in particular at the network side, may be an essential part of high-frequency wireless access in order to overcome the propagation challenges. Despite potential link budget gains, reliability of a system purely relying on beamforming and operating in higher frequencies might be challenging. In particular, coverage might be more sensitive to time/space variations. Hence, a tight integration of the LTE air interface and the new air 5G air interface, which is referred to as New Radio (NR) below, has been proposed.

With regard to specific architectures to realize a tight integration of LTE and NR (5G), it may be assumed that there are going to be common functionalities in the RAN protocol stack, in contrast to the current interworking between the different accesses such as a common PDCP layer for LTE and NR. In current systems (e.g. UMTS and LTE), differently from that assumption, interworking relies on inter-node interfaces, for both User Plane (UP) and Control Plane (CP). For example, in the case of E-UTRAN and UTRAN interworking, MME and S-GW are interconnected via the S11 interface. Such an architecture basically allows coverage continuity and load balancing only via hard handovers (always involving core network signalling) and semi-independent resource management for the multiple air interfaces.

A tight integration between LTE and NR has been captured as a requirement in 3GPP TR 38.913, "Study on Scenarios and Requirements for Next Generation Access Technologies", v0.3.0, http://www.3gpp.org/DynaReport/38913.htm. Here, it is noted that the "RAN architecture shall support tight interworking between the new RAT and LTE considering high performing inter-RAT mobility and aggregation of data flows via at least dual connectivity between LTE and new RAT. This shall be supported for both collocated and non-collocated site deployments." A corresponding objective was captured in the study item on New Radio Access Technology, 3GPP TSG RAN Meeting #71, RP-160671, New SID Proposal: Study on New Radio Access Technology. In order to realize the tight integration of LTE and the new 5G air interface, Da Silva et al., "Tight Integration of LTE and the new 5G air interface to fulfill 5G requirements", 2015 proposes a logical architecture relying on common RRC/PDCP protocol layers, as shown in FIG. 1A for the control plane. An alternative for common inter-node interfaces (X2*) is further shown in FIG. 1B for the case of standalone LTE and NR network nodes and a co-located LTE/NR network node, i.e. a network node in which LTE and NR are both implemented.

The simplest way to achieve a high performing inter-RAT mobility, in connected mode, between NR and LTE would be to define a single PDCP layer for both LTE and NR, i.e. a single PDPC specification and a single evolution track for both LTE and NR. This single PDCP could be the LTE-PDCP that is enhanced to also rely on services from NR lower layers or a new NR-PDCP specification that has LTE-PDCP as a starting point. In any of these cases, a handover between LTE and NR could possibly benefit from a continued PDCP context and retransmission of PDCP SDUs. In addition to the LTE-PDCP functions associated with the support of high performing mobility, other PDCP functions such as header compression and decompression and in-sequence delivery will also be needed in NR. Therefore, a single PDCP seems to be a reasonable starting point for the UP design to achieve a high performing inter-RAT mobility. This is shown in FIG. 2.

A single PDPC may also be beneficial for multi-RAT aggregation solutions, where PDCP PDU routing for transmission and PDCP PDU reordering for reception functions from LTE-PDCP could be reused. In that case, either NR or LTE may possibly be defined as the RAT where the flow is split. Therefore, the LTE-PDCP may rely on services from the lower layers of NR, as shown in FIG. 3.

With regard to the RRC design to support tight integration of NR and LTE, a particular aspect is related to the RRC support of dual connectivity. Here, for the support of active mode (or Connected state) transmissions for the UE one option would be to have a single set of RRC specification for both LTE and NR. Variants of that option are i) the extensions of LTE RRC functionality to cover NR functions or ii) the creation of a new set of specifications for NR that has LTE functions as starting point. Another option would be to have two RRC specifications, where some level of coordination may be envisioned, e.g. the definitions of some IEs across both specifications.

Regarding the active mode behavior support of dual connectivity, a single or a dual RRC machine may be defined. Here, a single RRC state machine is illustrated in FIG. 4. As such, most of the efforts so far have been concentrated on how to explore the dual connectivity enabled by LTE and NR when the UE is active, i.e. is transmitting some user plane (UP) data or even control messages. Some solutions may be found in Da Silva et al., "Tight Integration of LTE and the new 5G air interface (AI), also referred to as NR here, to fulfill 5G requirements", 2015.

FIG. 5 summarizes some of the features described in the Da Silva et al. In particular, within Control Plane Diversity a common control plane for LTE and NR would allow a dual-radio UE, i.e. a terminal device having both a dual receiver and transmitter in order to simultaneously connect to both LTE and NR, to have a single control point for dedicated signaling connected via the two air interfaces (AI). The main benefit here is to provide reliability without the need for explicit signaling to switch air an AI, which may be important in certain propagation scenarios where the connection on one AI is lost so quickly that no explicit "switch signaling" could have been performed. Further, in Fast Control Plane Switching the UE would be able to connect to a single control point via any of the AIs and switch very fast from one link to another without the need of an extensive connection setup signaling. This solution may also be used for other UE types than the dual radio UE, i.e. UEs having only a dual receiver but a single transmitter or single radio UEs capable of both AIs but only one at a time. User Plane Aggregation may allow a single data flow to be aggregated over multiple AIs, or to map different data flows on different AIs. In Fast User Plane Switching the user plane for one UE uses only a single AI at a time but a fast switching mechanism is provided between them. Such a mechanism may be applied for all types of UEs. Further, Lean by help of LTE is a feature to let the NR (new AI) transmitter be active when there are active UEs on NR, and to transmit information to idle mode UEs, e.g. system information, over LTE.

SUMMARY OF THE INVENTION

Problems with Existing Solutions

The sleep state for dual radio UEs has been, however, much less explored. In LTE the UE is said to be camping in a cell when it is ready to access the cell, i.e. it has acquired the cell's system information and knows how to send a preamble to the RACH. The UE camps in a LTE cell in what is called the RRC_IDLE state, which in LTE is the main sleeping state optimized for battery savings. In such a state, mobility is performed by UE via cell reselection and the UE is not known at the RAN level but only at the core network level in what is called a Tracking Area or Tracking Area list composed by a set of LTE cells. This is needed in the case the network needs to contact the UE, e.g. via paging. As such, in the worst case, the CN needs to send a paging command to the cells belonging to the Tracking Area list that the UE has been configured with. As the UE moves around the network it needs to inform the core network, more specifically the MME, via NAS signaling in the case it has changed its Tracking Area to a Tracking Area not in the Tracking Area list so that the network can still page the UE. Similar but slightly different concepts are also used in 2G (GSM/GPRS), 3G (WCDMA/UMTS, CDMA2000, CDMA EV-DO) systems.

Currently, the idle state is used as the main state for UE inactivity in the RAN. In the current idle mode in LTE there is support for mobility between different RATs, typically operating on different frequencies. There are also enhancements available for minimizing Tracking Area (or Routing Areas, or Location Areas) update signaling towards the network when the UE moves between two RATs in idle mode. For example, in GSM and WCDMA (UMTS) it is possible to configure Location Areas or Routing Areas that span over both RATs. In this case the UE does not need to perform a Location or Routing Area Update procedure when it moves between the RATs in Idle state. The network would be responsible for paging in both RATs when it wants to reach the UE. Similarly there has been defined mechanism in LTE and 3G allowing the UE to be registered to both LTE and 3G core network, making it possible to after initial registration move back and forth in idle state between LTE and 3G without performing signaling.

A key aspect of these prior art solutions is that the UE only camps in one RAT at the time. The RAT the UE should camp in is controlled by priorities for the different RATs/carrier frequencies and radio quality thresholds. For example, when the radio conditions of one RAT with higher priority is below a given threshold (possibly informed via system information) the UE starts to measure a neighbor RAT and when some conditions are fulfill the UE starts to camp in the other RAT. The RAT the UE camps in is both the RAT the UE is supposed to monitor for incoming calls/paging and/or the RAT the UE tries to access (e.g. using random access) when there is uplink data in a corresponding buffer waiting to be transmitted. That is, the same RAT, i.e. the RAT the UE is camping in, is used both for paging and network access.

In order to address the tight integration of NR and LTE, a new state model, as shown in FIG. 6, has been proposed for the 5G architecture in order to enable an efficient UE sleeping, a fast and lightweight transition from sleeping to active states and joint access optimizations such as a fast establishment of dual connectivity, i.e. to quickly add a secondary NR link when UE initially access over LTE and vice versa. In the proposed state model the UE can either start the access, e.g., by powering on via NR or LTE. If the UE starts via LTE it goes to CONNECTED state and is configured to use the LTE carrier. If it starts over NR, it also goes to CONNECTED state but is configured to use the NR carrier.

With the introduction of dual connected devices capable of being connected to both LTE and NR at the same time it is, however, possible to consider also terminal devices that are able to camp on multiple RATs at the same time.

Most of the efforts in the area of multi-RAT tight integration (especially LTE and NR for the 5G RAN) have, so far, addressed connected UE's. Meanwhile the proposed state machine of the NR concept comprises a sleeping state that is related to both LTE and NR radios. Issues related to the UE and RAN behavior in sleeping state are of major interest. More specifically, there are currently no mechanisms to control dual camping, i.e. camping in two different RATs at the time, especially when it comes to when and how a terminal device (UE) should perform tracking or NR registration area updates. If such mechanisms were available, this could open up further enhancements leading to higher reliability (bounded latency, e.g. a latency in the order of 1 millisecond), and also less signaling for tracking or NR registration area updates or alternatively less paging in the network.

As such, there is a need to provide a mechanism to control multi-RAT camping.

Solution

Accordingly, it is an object of the present invention to solve the above described problems. To overcome the disadvantages of the above described disadvantage the present invention introduces a mechanism for coordinating simultaneous multi-RAT camping.

Suitable methods, a network node, a terminal device, a computer-readable storage medium, a computer program, and a carrier containing the computer program are defined in the independent claims. Advantageous embodiments are defined by the dependent claims.

In one embodiment, a method is defined in a wireless communication network, said wireless communication network providing radio access for a terminal device via at least a first and second type of wireless radio accesses operating with different radio access technologies, RATs, wherein the method comprises the steps of: transmitting, by a network node, an indication regarding a set of camping areas, CAs, including a first set of camping areas being associated with the first RAT and a second set of camping areas being associated with the second RAT; performing, by the terminal device, camping in a coverage area defined based on the set of CAs; updating, by the terminal device, the communication network with a geographic location of the terminal device (a) when the terminal device enters a new coverage area being different from the coverage area defined by both the first and second set of CAs as a first mechanism, or (b) when the terminal device enters a new coverage area being different from the coverage area defined by one of the first and second set of CAs as a second mechanism.

In a further embodiment, a method is defined in a terminal device, said terminal device being capable of monitoring channels via at least a first and second type of wireless radio accesses operating with different radio access technologies, RATs, wherein the method comprises the steps of: receiving an indication regarding a set of camping areas, CAs, including a first set of camping areas being associated with the first RAT and a second set of camping areas being associated with the second RAT; performing camping in a coverage area defined based on the set of CAs; and updating the communication network with a geographic location of the terminal device (a) when the terminal device enters a new coverage area being different from the coverage area defined by both the first and second set of CAs, as a first mechanism, or (b) when the terminal device enters a new coverage area being different from the coverage area defined by one of the first and second set of CAs, as a second mechanism.

In a further embodiment, a method in a network node, said network node providing one or more channels via a first and/or second type of wireless radio accesses operating with different radio access technologies, RATs, wherein the method comprises the steps of: transmitting, to a terminal device, an indication regarding a set of camping areas, CAs, including a first set of camping areas being associated with the first RAT and a second set of camping areas being associated with the second RAT; transmitting a control instruction to configure the terminal device to apply a CA update mechanism to (a) update a geographic location of the terminal device when the terminal device enters a new coverage area being different from the coverage area defined by both the first and second set of CAs, as a first mechanism, or to (b) update a geographic location of the terminal device when the terminal device enters a new coverage area being different from the coverage area defined by one of the first and second set of CAs, as a second mechanism.

In another embodiment, a network node and a terminal device are respectively defined which are adapted to perform the above methods. In still further embodiments, a corresponding computer-readable storage medium, computer program, and carrier containing the computer program are defined.

Advantages

Multi-RAT camping enables the UE to monitor both RATs at the same time in a sleeping state, i.e. inactive state, idle and/or some other sort of dormant state. As such, the UE can either more quickly select which RAT it should try to access or try to access both simultaneously in order to increase robustness and/or to more quickly get access to multi-connectivity, e.g. dual connectivity in the multi-RAT case or carrier aggregation in the single RAT/multi-carrier case.

From a network perspective, the concept of the present invention may also save network signaling for paging. If the UE camps on both RATs the network could choose to only page in one of the RATs, possibly followed by paging in the other RAT in case no response is received on the paging in the first RAT. That might be beneficial in the case the UE moves across RATs without notifying the network. Especially in non-collocated scenarios this would avoid the need to specify an X2*-based paging solution between LTE and NR.

BRIEF DESCRIPTION OF THE DRAWINGS

The embodiments herein will now be further described in more detail in the following detailed description by reference to the appended drawings illustrating the embodiments and in which.

DETAILED DESCRIPTION

Figure 1A:
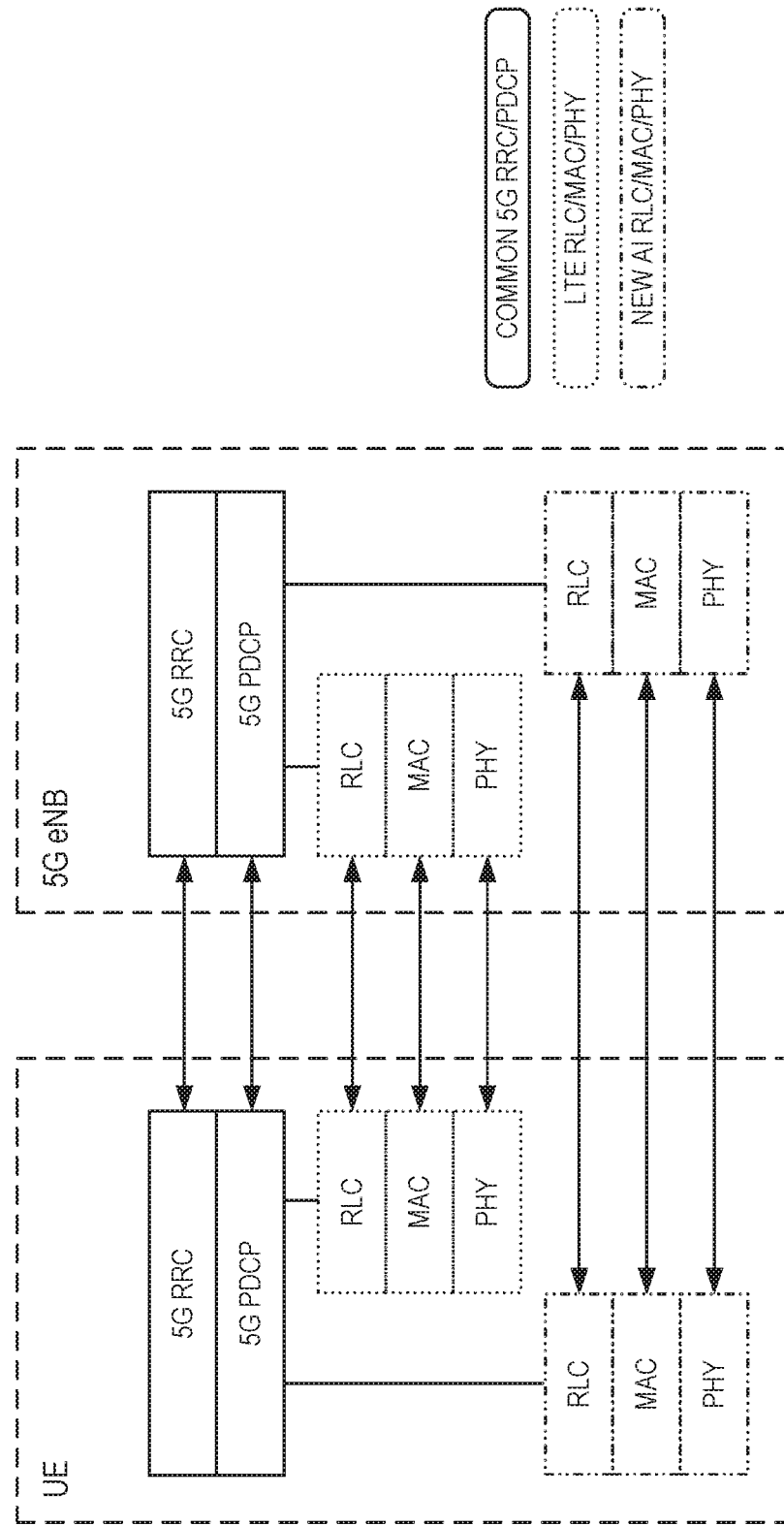
FIG. 1A shows a protocol architecture for the 5G RAN control plane.
Figure 1B:
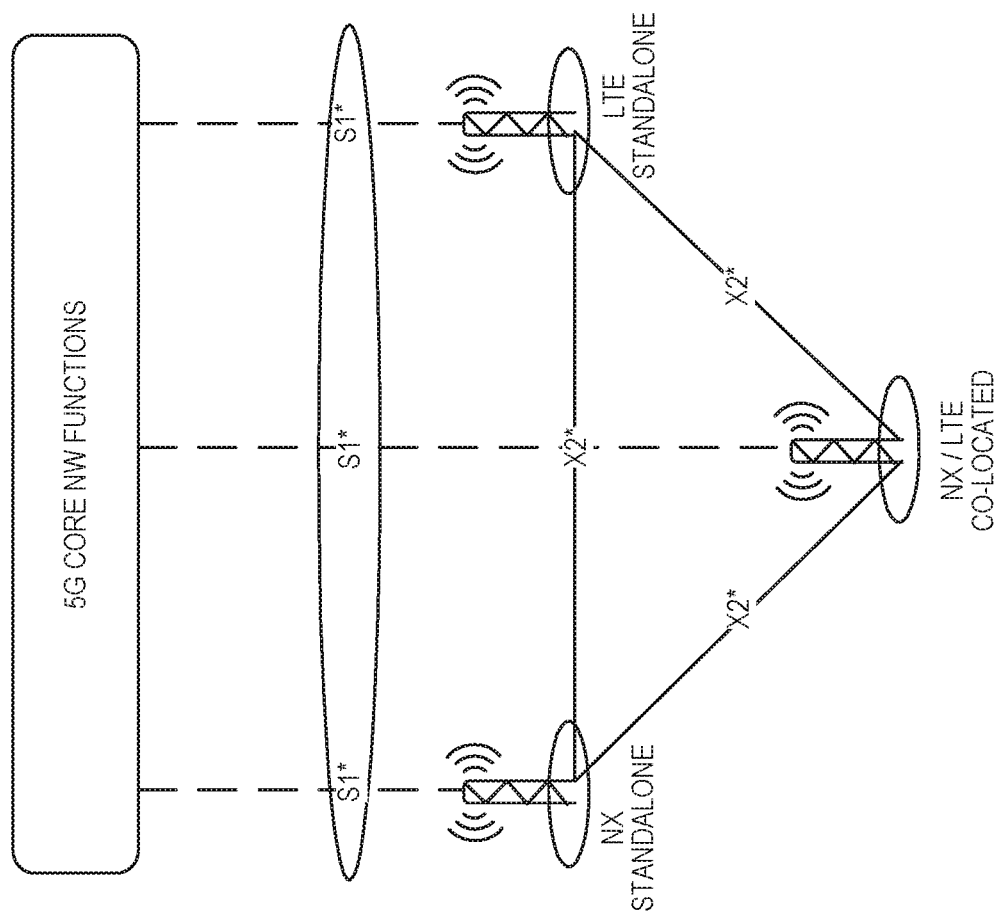
FIG. 1B illustrates a 5G RAN architecture showing inter-node interfaces.
Figure 2:
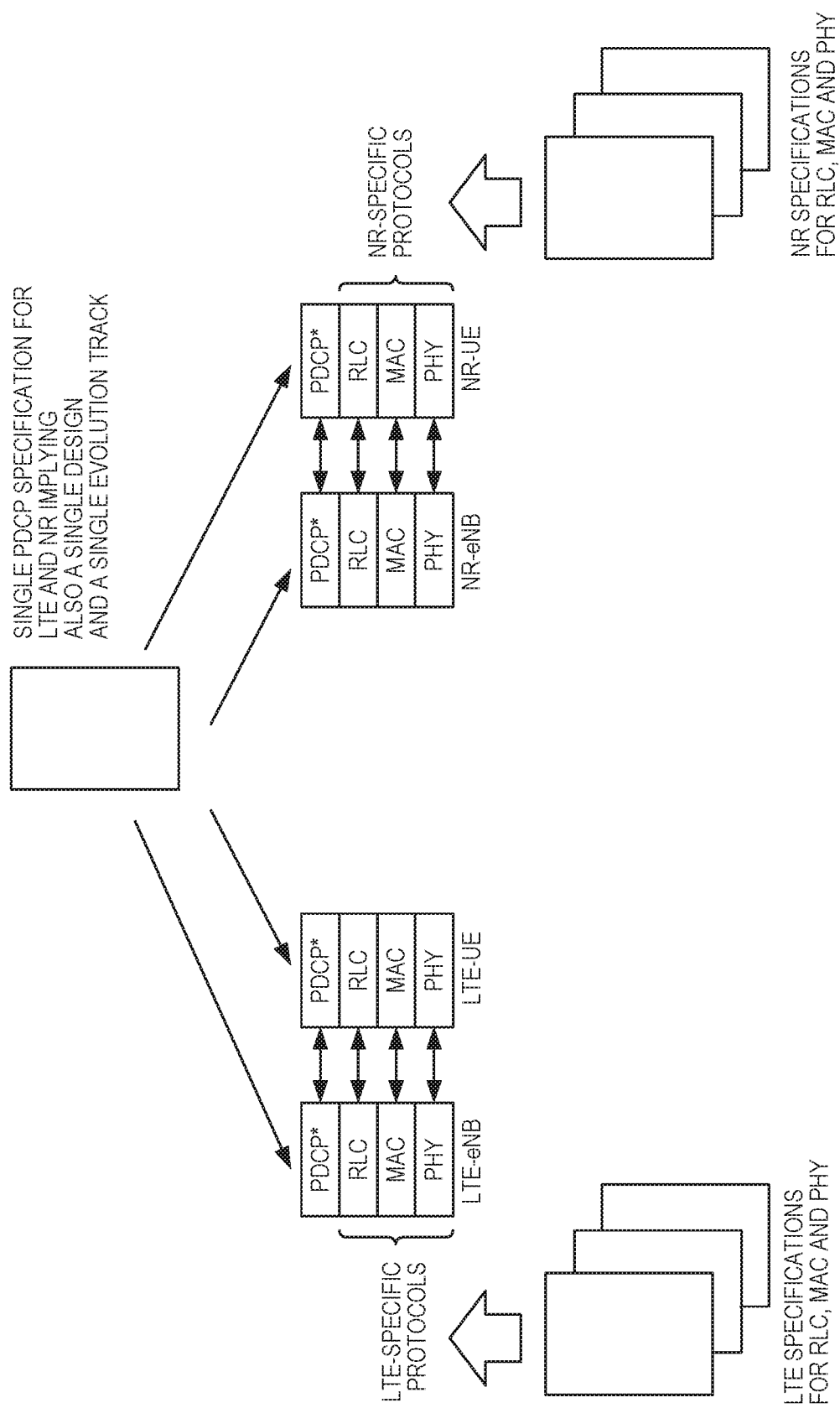
FIG. 2 shows a single PDCP for LTE and NR with a single specification and evolution track.
Figure 3:
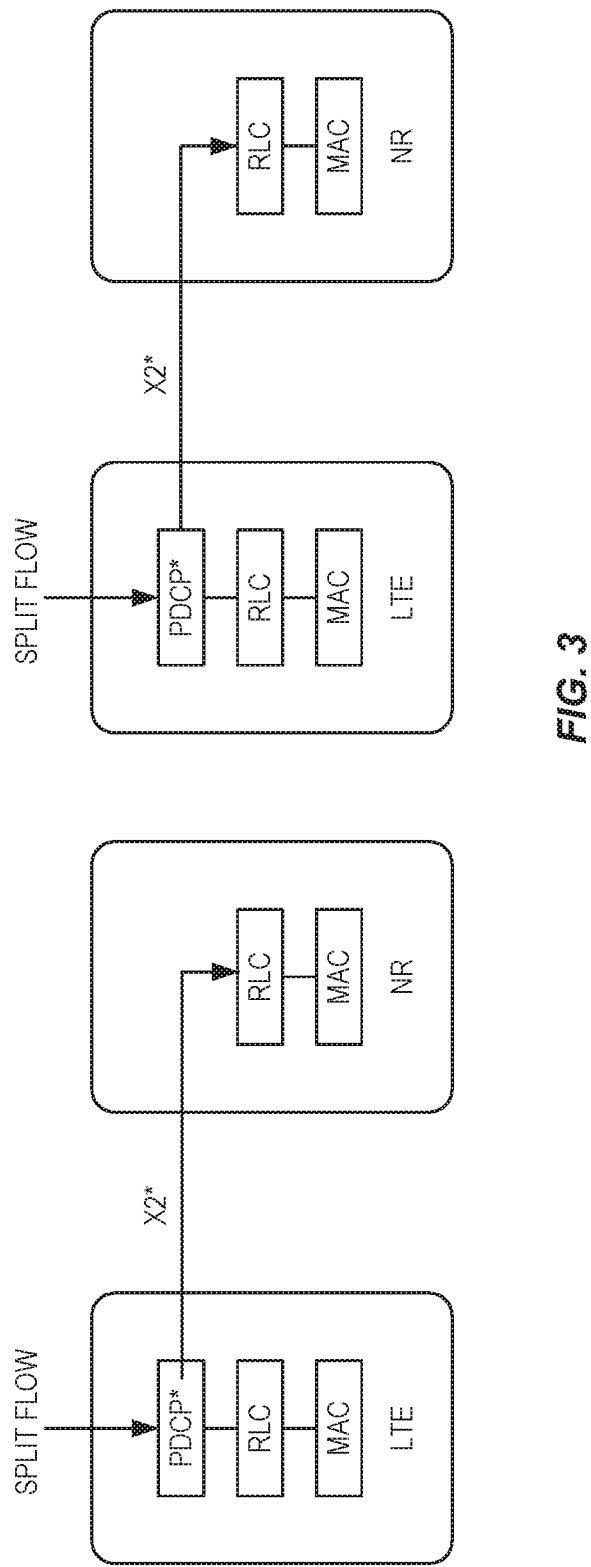
FIG. 3 shows dual connectivity solutions with a single PDCP.
Figure 4:
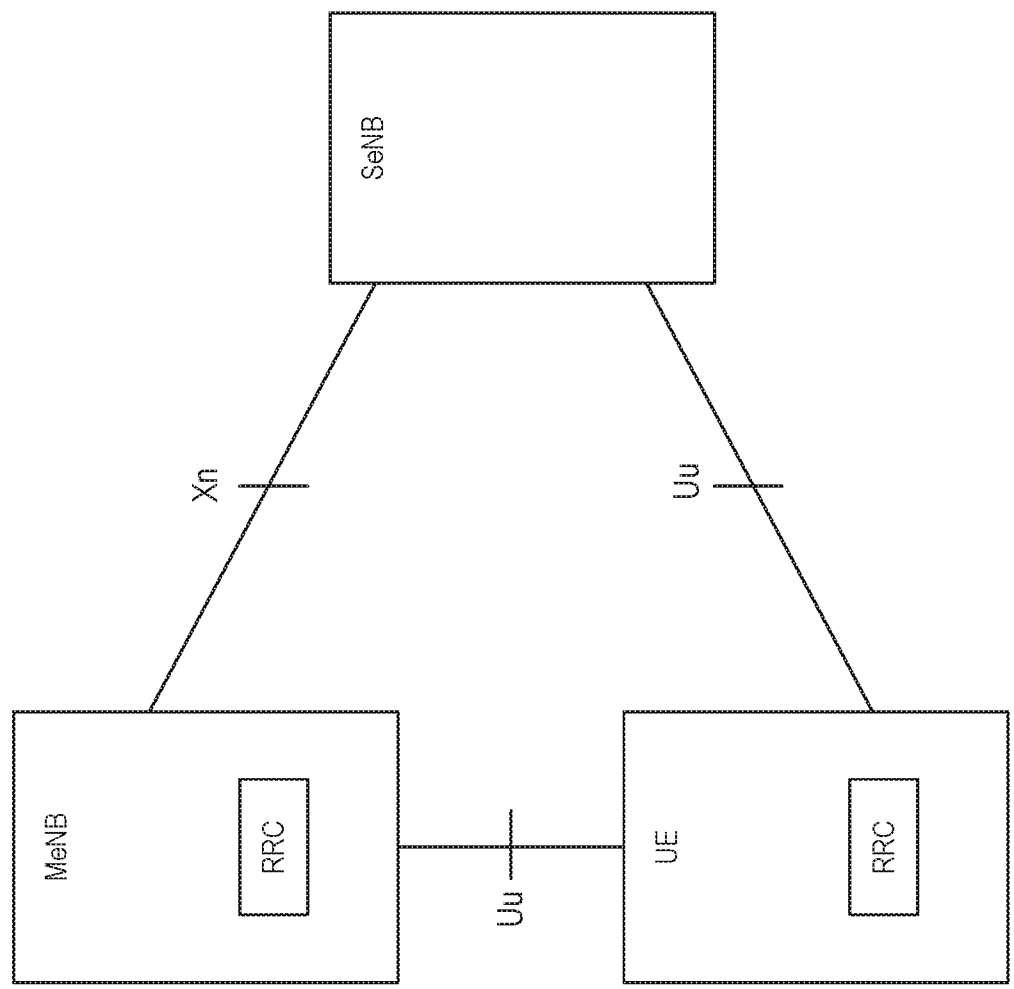
FIG. 4 shows a single state machine for UEs in dual connectivity between NR and LTE.
Figure 5:
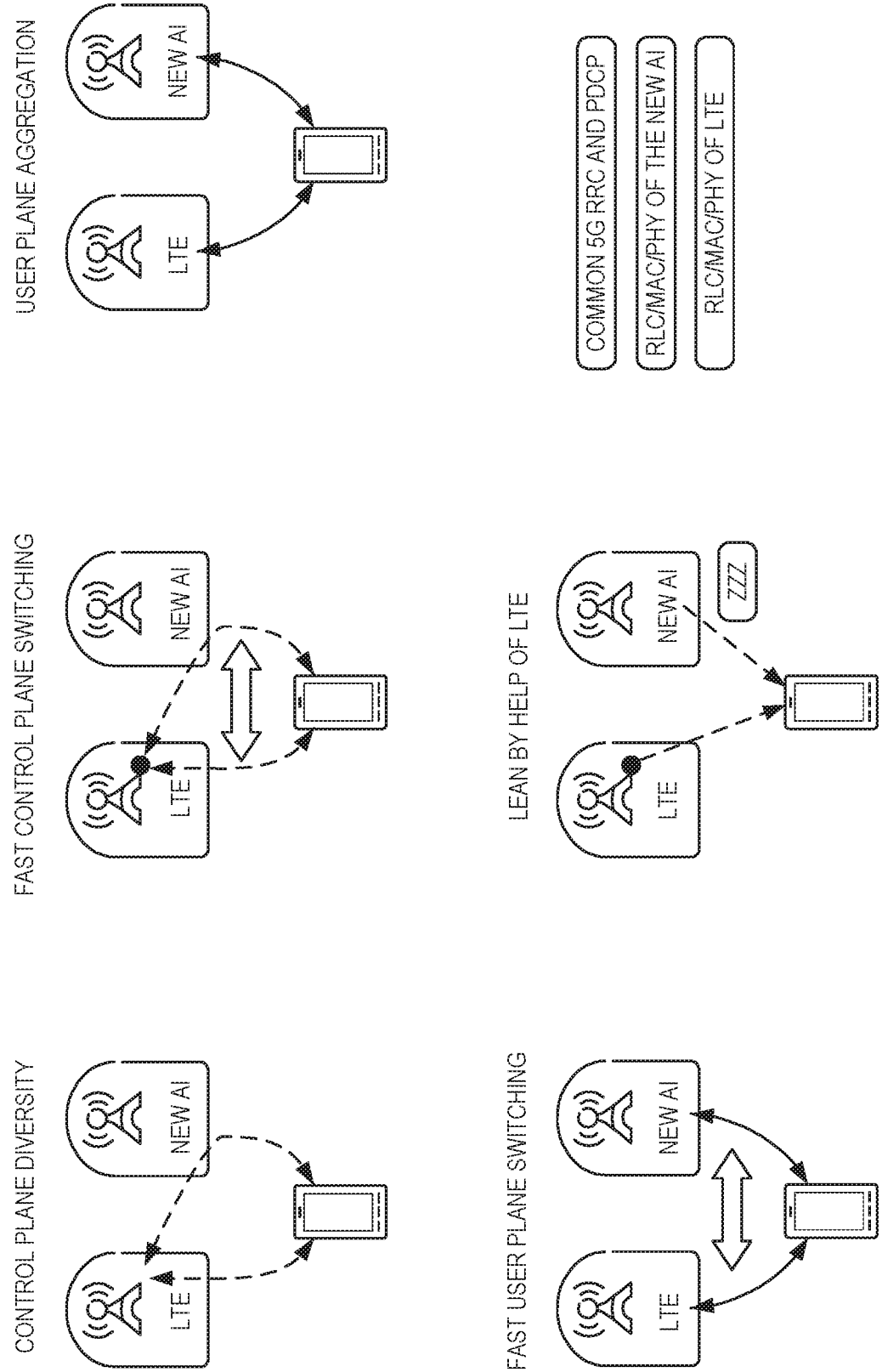
FIG. 5 shows Multi-RAT features for the connected mode
Figure 6:
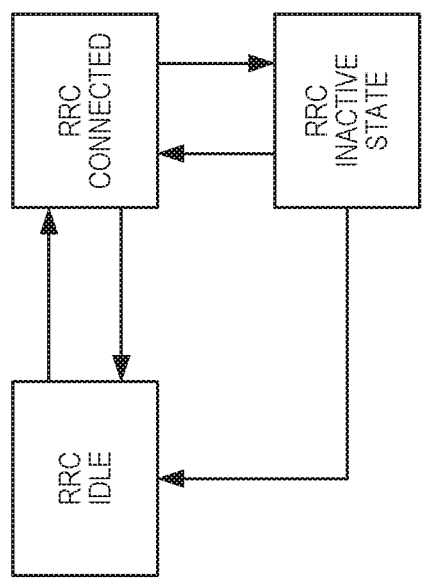
FIG. 6 shows a UE state model for LTE and NR.

In the following, embodiments are described with reference to the appended Figures. It is noted that the following description contains examples only and should not be construed as limiting the invention. A person skilled in the art will recognize additional features and advantages upon reading the following detailed description. Further, similar or same reference signs indicate similar or same elements or operations.

Embodiments of the present invention facilitate having a terminal device (UE) to simultaneously camp on at least two different wireless radio access technologies (RATs) when an interworking or integration between the two RATs is employed to increase the flexibility for the UE to move around the coverage of different RATs without having to update the network when it moves from one RAT to another. Here, the terminal device (which is also referred to as UE in the following) may be a mobile or a fixed terminal device. The terminal device is a wireless terminal device, and may be a (fixed or mobile) user device (UE) or a MTC device, for example a "self-driving car", capable of having a radio access over at least two different radio access technologies to one or more base stations (eNB). Further, the network node (base station) is a radio access network node of a wireless communication network, in particular a radio access node for providing a radio access to the terminal device, and also has a coverage area (including based on the beam-forming process, as described above) in which it may provide the radio access. It is also noted the base station may also support multiple radio accesses, such as the LTE Evolution radio access technology and the 5G radio access technology (NR). Such a radio access may be of any spectrum or standard (GSM, GPRS, 3G, 4G, LTE, 5G, NR, WiFi, even DECT, etc.). Furthermore, the radio access network (RAN) node may be connected with a core network node (such as the MME) and/or other RAN nodes, as explained above.

A particular technical problem of the 5G technology is the "tight integration" with LTE. This means that 5G systems providing a first type of radio access technology, i.e. a NR RAT, and LTE systems providing a second different type of radio access technology, i.e. a LTE RAT, will have a very tight cooperation and integration level. Traditionally, a terminal device (UE) in a dormant state, e.g. idle mode/inactive state/suspended state, camps in one cell within one RAT, e.g. GSM, UMTS, or LTE. By "camp" or "camping", it is meant that the UE monitors a set of downlink control channels. For LTE, this means that the UE is monitoring the PCI and reference signals which are cell specific and reads the system information when appropriate. In addition, the UE in LTE monitors the PDCCH to check for pages at its specific paging occasions. The UE has therefore acquired the system information and is ready to access the cell.

With NR-LTE tight integration, it is proposed here that a terminal device (UE) has the capability to camp in both NR and LTE cells at the same time, which is also referred to as "dual camping" in the following. This means that the UE will be able to monitor the corresponding downlink control channels, read the system information, and receive paging in both LTE and NR RAT systems. This may also mean that the UE could possibly access multiple RATs simultaneously.

The network may configure a UE to allow performing dual camping. Further, the network may configure the UE to use different mechanisms for page monitoring and for updating the network with the location of the UE. Hence, in the context of the present invention the term "Camping Area" (CA) is defined as a general term for the kind and/or size of an area (such as an area being related to a cell, a coverage area that relies on beamforming, a tracking area, a set of beams represented by beam identifiers, and the like), and can be used to build up a definition of an area in which a UE is allowed to move around without informing the network of its whereabouts. In LTE a CA is realized as a Tracking Area.

With this term, the procedure of reporting the UE's location to the network is generally referred to as "Camping Area Update" or "CA Update" or "CAU". The network indicates presence of a CA by broadcasting the CA's CA Identifier (CAI) (e.g. the Tracking Area Identifier (TAI) in LTE).

The general concept of the present invention is based on a network or policy based control mechanisms governing the camping behavior of the UE that can monitor channels on multiple RATs in areas with overlapping (geographical) coverage. The control mechanism may be based on different properties such as UE type/capabilities, type of (typically used and/or possibly ongoing) services, the network slicing instance(s) the UE might belong to, the need to quickly establish multi-connectivity such as dual connectivity and/or carrier aggregation, UE battery conditions, the coverage pattern of one RAT vs. another and/or the overlapping coverage area and/or stability of that.

According to a concept of the present invention the network may configure the UE with rules (mechanisms) for how to behave when camping in idle mode (or a similar mode like dormant or sleep mode) and there is more than one RAT available, in particular LTE and NR. The rules apply to the UE's behavior in terms of updating the network with the location of the UE as well as how/what to monitor to check for pages. This rule configuration preferably occurs when the UE is configured with a set of CA(s), i.e. Tracking Areas in LTE and some corresponding areas in NR, covering both/all RATs or, alternatively, one set for each RAT, in which UE can move around without informing the network of its whereabouts and in which the network may potentially page the UE.

Figure 7:
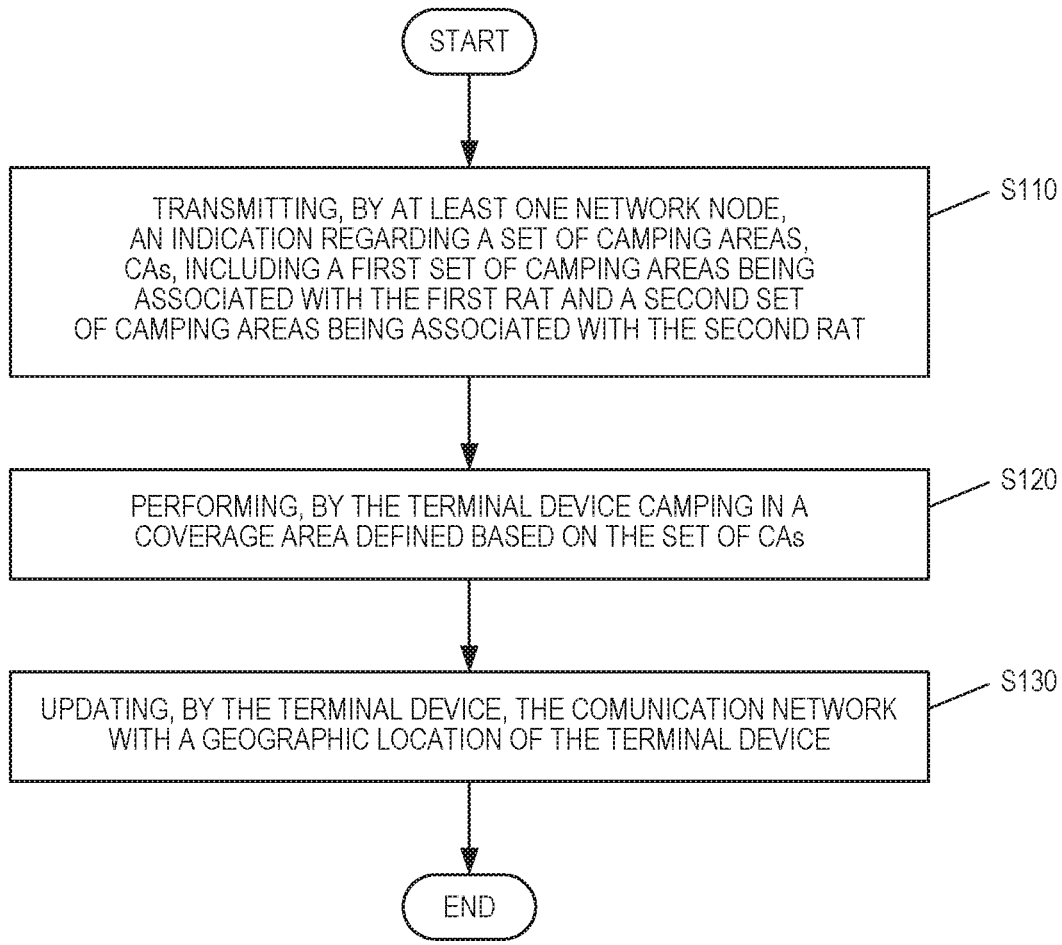
FIG. 7 is a schematic flow diagram illustrating an embodiment of a method for the coordinating of simultaneous multi-RAT camping.

FIG. 7 illustrates a flow diagram of a method in a wireless communication network according to an embodiment. Here, the wireless communication network provides, via one or more network nodes (eNBs) 301, 302 radio access for a terminal device 10 via at least a first (RAT1) and a second (RAT2) type of wireless radio accesses that operate with different RATs. Here, the radio access may be provided in a coverage area that has, at least partially, an overlapping coverage of RAT1 and RAT2.

According to step S110 of FIG. 7 at least one network node (eNBs) 301, 302 transmits an indication regarding a set of camping areas, CAs, including a first set of camping areas (CA-RAT1) being associated with the first RAT and a second set of camping areas (CA-RAT2) being associated with the second RAT. In particular, the indication information may be transmitted in a synchronized manner via multiple network nodes (eNBs) 301, 302. Here, a camping area CA-RAT1 being associated with the first RAT may not necessarily be the same as the camping area CA-RAT2 being associated with the second RAT. For example, camping area in LTE (RAT1) may be given by a cell while a camping area in NR (RAT2) may be given by a beam or a system information coverage area (which may be referred to as system area). As will be further described below, the indication of CA(s) may be reported by CA Identifier, via dedicated signalling or common signaling, e.g. within a single list or a list per RAT. The indication may thus include a list or a set of lists indicating one or more CAs of the first set of camping areas CA-RAT1 and/or indicating one or more CAs of the second set of camping areas CA-RAT2. Here, the list may be one list that is common for both RAT1 and RAT2. In other words, a current (e.g. available at the current position of the terminal device) set of camping areas may either be indicated to the terminal device 10 with regard to only one of the RATs or with regard to both RAT1 and RAT2. This provides a dynamic updating capability which is sufficiently flexible to update the relevant set of camping areas, for example when the terminal device 10 moves into areas where only the set of camping areas with regard to one of the two RATs change.

Figures 8A, 8B:
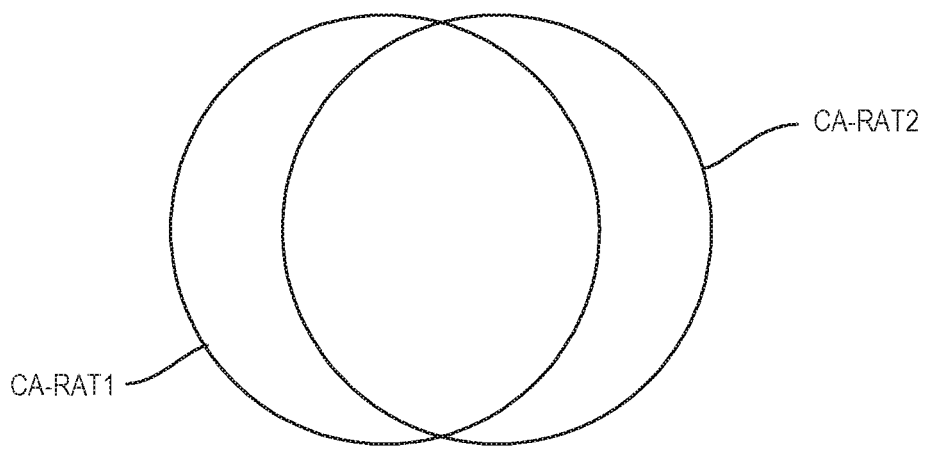
FIG. 8A schematically illustrates a coverage area defined by a first set of camping areas (CA-RAT1) and a second set of camping area (CA-RAT2).
FIG. 8B schematically illustrates a list of a first set of camping areas (CA-RAT1) and a second set of camping area (CA-RAT2).

As illustrated in FIG. 8A, the first set of camping areas CA-RAT1 may define a (geographic) area that is at least partially overlapping with a second set of camping areas CA-RAT2. That is, the combination of CA-RAT1 and CA-RAT2 may define a common coverage area in which radio access is available via both the first and second RAT and in which radio access is available via only the first or the second RAT. Such a situation may occur in a non-collocated scenario, i.e. where LTE and NR are implemented by different network nodes 301, 302. This situation may also occur in a co-located scenario, i.e. where LTE and NR are implemented by the same network node (e.g. only in 301 or 302), and where the NR air interface has a lower coverage, a spottier coverage (e.g. mainly at a cells center), relies on beamforming or the like. The combination of CA-RAT1 and CA-RAT2 further defines a (geographical) coverage area in which the terminal device 10 is allowed to move around without informing the network of its whereabouts. Alternatively (not shown), the first set of camping areas CA-RAT1 may define a (geographic) area that is essentially completely overlapping with the second set of camping areas CA-RAT2, such as in co-located situations. Further, FIG. 8B indicates an exemplary list in which the set of camping areas being associated with the first RAT includes four CAs, i.e. CA-RAT1a, CA-RAT1b, CA-RAT1c, CA-RAT1d, and which the set of camping areas being associated with the second RAT includes three CAs, i.e. CA-RAT2a, CA-RAT2b, CA-RAT2c. Needless to say, this example of a set of first and second CAs (CA-RAT1 and CA-RAT2) is only provided for the purpose of explaining the concept of the present invention and is not limiting in any way. Based on the above transmission step S110 in FIG. 7, the presence of such a set of CAs is indicated to the terminal device 10.

Each of the CAs included in the indication, as shown for example in FIG. 8B, may further be provided with a priority indication. Such a priority may indicating a preferred CA the terminal device should select to access the network, in particular in a case where the terminal device is in a location that belongs to multiple CAs. Such a priority may further indicate a preferred RAT of the plural RATs that the terminal device should preferably select to access the network. The preferred RAT in the preferred CA may be area/location dependent, or the like. Here, the CA priority indication may be replaced with a RAT preference indication. As such, the UE may prioritizes one of the RATs when performing access, when there is a choice, and, for example, when load condition of the overall network warrant such a distribution of RATs.

Further, according to step S120 of FIG. 7 the terminal device 10 performs camping in the coverage area that is defined based on the transmitted set of CAs, i.e. CA-RAT1 and CA-RAT2. Such a configuration may be triggered by a radio network node 30 or a core network node 50, which allows the terminal device 10 to, for example, perform dual camping if the terminal device 10 is in the coverage area of both RAT1 and RAT2. Here, dual camping may be performed during a "dormant state", i.e. during an idle mode, an inactive state, a suspended state of the terminal device 10, or the like. As explained above, dual camping means that the terminal device 10 camps in both the first and second RAT simultaneously, monitors corresponding downlink control channels (for example, in at least one of the RATs), reads the system information (CA Identifiers in the area, as signalled by the network via common signaling), may receive paging commands in both the first and second RATs, and potentially accesses multiple RATs simultaneously.

Further, according to step S130 of FIG. 7 the terminal device 10 may be configured, by the network side, with at least a first and a second mechanism that concern the behavior of the terminal device 10 in cases when (a) the terminal device 10 enters a new coverage area being different from the coverage area defined by both the first and second set of CAs (CA-RAT1, CA-RAT2), for example all CAs as illustrated in FIG. 8B, and in cases when (b) the terminal device 10 enters a new coverage area being different from the coverage area as defined by only one of the first and second set of CAs, for example CA-RAT2a, CA-RAT2b, CA-RAT2c as illustrated in FIG. 8B. In another embodiment, the trigger condition to perform an update of the geographic location of the terminal device may be based on a condition when the terminal device leaves the coverage area defined by both the first and second set of CAs (CA-RAT1, CA-RAT2) (case a) or when the terminal device leaves the coverage area as defined by only one of the first and second set of CAs (case b).

Here, according to the first mechanism, case (a), the terminal device 10 may use a Camping Area Update to provide the communication network with an update as to a present geographic location when a new coverage area is entered or when the common coverage area is left. In particular, a Camping Area Update message may be transmitted from the terminal device 10 to a network node 301, 302 which may subsequently transmit the Camping Area Update information to a core network node 50, such as MME. In other words, the terminal device 10 does not provide a reporting/updating of its location (e.g. perform CA Update) as long as the terminal device 10 remains within the geographic coverage of the both the first and second set of CAs.

Further, according to the second mechanism, case (b), the terminal device 10 may use a Camping Area Update to provide the communication network with an update as to a present geographic location when the coverage area of only one of the first or second set of CAs is left. This update of the geographic position may thus be conducted even if the terminal device 10 is still in the coverage area of the other one (i.e., the one that is not left) of the set of CAs. In other words, the UE can be configured to report its location (e.g. perform CA Update) as soon as it leaves the coverage area of the configured set of CA(s) in one of the RATs or as soon as it exits a new coverage area that is different from the configured set of CA(s) in one of the RATs, even if it is still in coverage of a CA in the configured set in the other RAT(s).

Further, terminal device 10 may be configured, by the network side, with a third mechanism as to the update of the geographic location of the terminal device 10. Here, the first RAT being associated with the first set of camping areas CA-RAT1 may be a priority RAT and the second RAT being associated with the second set of camping areas CA-RAT2 maybe a backup RAT. According to this classification of the RATs, the third mechanism configures the terminal device 10 to (c) update the communication network with a geographic location of the terminal device when the terminal device 10 leaves the coverage area that is defined by the first set of camping areas CA-RAT1, i.e. when the terminal device 10 loses coverage by the priority RAT, or when the terminal device 10 enters a coverage area that is different from the coverage area that is defined by the first set of camping areas CA-RAT1. This update of the geographic position may thus be conducted even if the terminal device 10 is still in the coverage area of the backup RAT as defined by the second set of camping areas CA-RAT2. With regard to the exemplary situation illustrated in FIG. 8B, the terminal device 10 would thus perform a Camping Area Update when the coverage area as defined by CA-RAT1a, CA-RAT1b, CA-RAT1c, CA-RAT1d is left, even if the terminal device 10 is still within the coverage area of CA-RAT2a, CA-RAT2b, CA-RAT2c. According to this classification of the RATs, the third mechanism further configures the terminal device 10 to (d) not update the communication network with a geographic location of the terminal device when the terminal device 10 leaves the coverage area defined by the second set of camping areas (CA-RAT2), i.e. the backup RAT, but remains within the coverage area defined by the first set of camping areas (CA-RAT1), i.e. the priority RAT.

With regard to the updating step S130 described above, in particular with regard to the first, second, and third mechanism (case c), the Camping Area Update of the terminal device may be an update for the first RAT and/or the second RAT, i.e. a single update with regard to only one RAT or a combined update for both RATs.

Further, the terminal device 10 may be provided with a control instruction from the network node 301, 302 which configures the terminal device to apply the first, second, or third mechanism. Such a control instruction, which is preferably set by a core network node or a policy control mechanism that is implemented in the terminal device, may be based on at least one of:
the terminal device type,
the terminal device capabilities,
type of service,
the communication network slicing instance(s) the terminal device might belong to,
a need to establish multi-connectivity such as dual connectivity and/or carrier aggregation,
a battery condition of the terminal device, and
a coverage pattern of the first and second RAT, the overlapping coverage area, and a stability of the overlapping coverage area.

Figure 12:
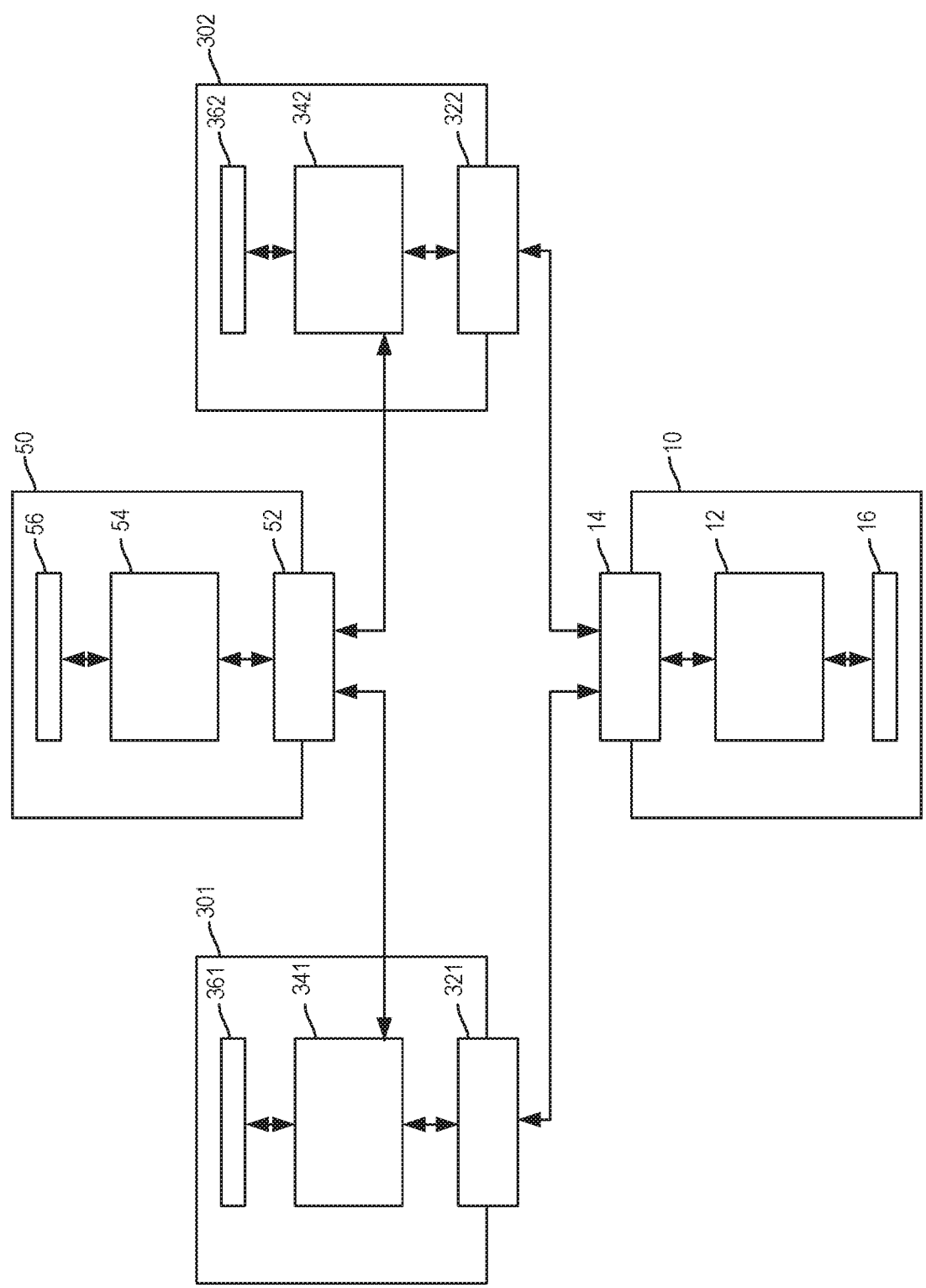
FIG. 12 is a schematic diagram illustrating a terminal device and a network node interacting via radio access network nodes for coordinating of simultaneous multi-RAT camping.

FIG. 12 schematically illustrates a terminal device 10 being accessible via a first radio access network node 301 and a second radio access network node 302 to a respective first and second type of wireless radio accesses operating with different radio access technologies. The radio access network nodes 301, 302 are further illustrated to have a communication connection (wireline or wireless) with another network node 50 which may be a core network node (such as a MME) or another network node, for example operating as an anchor node in the context of RAN internal paging. Such a scenario illustrates a non-collocated air interface, i.e. where RAT1 and RAT2 are implemented in different radio access network nodes 301 and 302. This is, however, not limiting, and the concept of the present invention also applies for a collocated scenario in which RAT1 and RAT2 are both implemented in the same radio access network nodes 301.

The terminal device 10 is provided with a radio transceiver module 14 that provides an air interface to the corresponding radio transceiver modules 321 and 322 of the respective radio access network nodes (eNBs) 301, 302. The radio transceiver modules 12 and 34 may respectively include transmitter circuits, receiver circuits, and associated control circuits that are collectively configured to transmit and receive signals and messages according to a respective different radio access technologies. The network node 50 is provided with a transceiver module 52 that provides the communication connection (wireline or wireless) with the radio access network nodes (eNBs) 301, 302.

As further illustrated in FIG. 12 the terminal device 10, the radio access network nodes 301, 302, and the (core or anchor) network node 50 further comprise a processing module 12, 341, 342, 54, respectively, that are configured to control the radio transceiver module 14, the radio transceiver modules 321 and 322, and the transceiver module 52 respectively. Each of the processing modules 12, 341, 342, 54 comprises one or more processors, e.g. one or more microprocessors, microcontrollers, multi-core processors, or the like. More generally, the processing module(s) may comprise fixed circuitry or programmable circuitry that is specifically configured via the execution of program instructions implementing the functionality taught therein, or may comprise combinations of fixed and programmable circuitry. Each of the processing modules also include and are connected to a respective memory module 16, 361, 362, and 56 respectively. The memory module(s), in some embodiments, store one or more computer programs and, optionally, configuration data. The memory module provides non-transitory storage for the computer program and it may comprise one or more types of computer-readable media, such as disk storage, solid-state memory storage, or any combination thereof. By way of non-limiting example, the memory module may comprise any one or more of SRAM, DRAM, EEPROM, and FLASH memory, which may be in the processing module 12, 341, 342, and 54 respectively and/or separate from the processing module. In general, the memory module comprises one or more types of computer-readable storage media providing non-transitory storage of the computer program and any configuration data used by the terminal device/network node. Here, "non-transitory" means permanent, semi-permanent, or at least temporarily persistent storage and encompasses both long-term storage in non-volatile memory and storage in working memory, e.g., for program execution.

Figure 9:
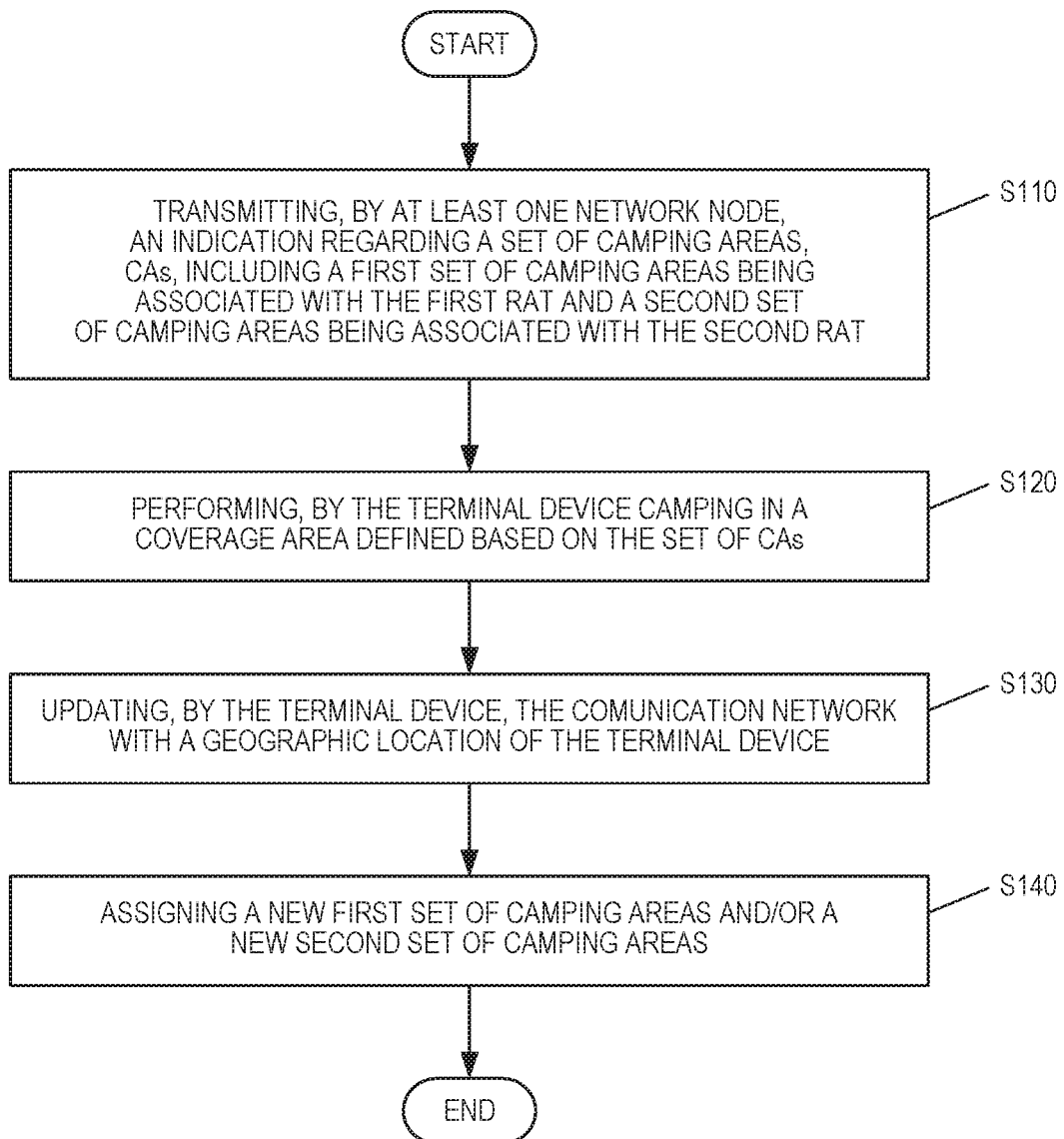
FIG. 9 is a schematic flow diagram illustrating another embodiment of a method for the coordinating of simultaneous multi-RAT camping.

FIG. 9 illustrates a flow diagram of a method in a wireless communication network according to another embodiment. Further to the steps S110, S120, and S130 as illustrated above, and in response to the update (Camping Area Update) according to the first, second, or third mechanisms (as described above) as to the current geographic position of the terminal device when the terminal device leaves an indicated coverage area or enters a new coverage area that is different from the indicated coverage area, the communication network, in particular a core network node 50, such as MME, or a core network functionality assigns in step S140 a new first set of camping areas CA-RAT1 and/or a new second set of camping areas CA-RAT2. This new set of camping areas is assigned according to the current geographic position of the terminal device, and may be transmitted to the terminal device by a radio network node (eNB) 301, 302 which may be a standalone base station providing LTE radio access (RAT1) or a standalone base station providing NR radio access (RAT2) in a non-collocated scenario, or maybe a base station in which RAT1 and RAT2 are co-located. The assignment process in step S140 may also be performed in a way that takes into account, for example, the current load conditions in the RATs, or by taking other factors of the RATs at the current geographical position of terminal device 10 into account. The newly assigned set of camping areas is subsequently indicated to the terminal device 10, for example on the basis of a transmission step as described above in step S110.

Figure 10:
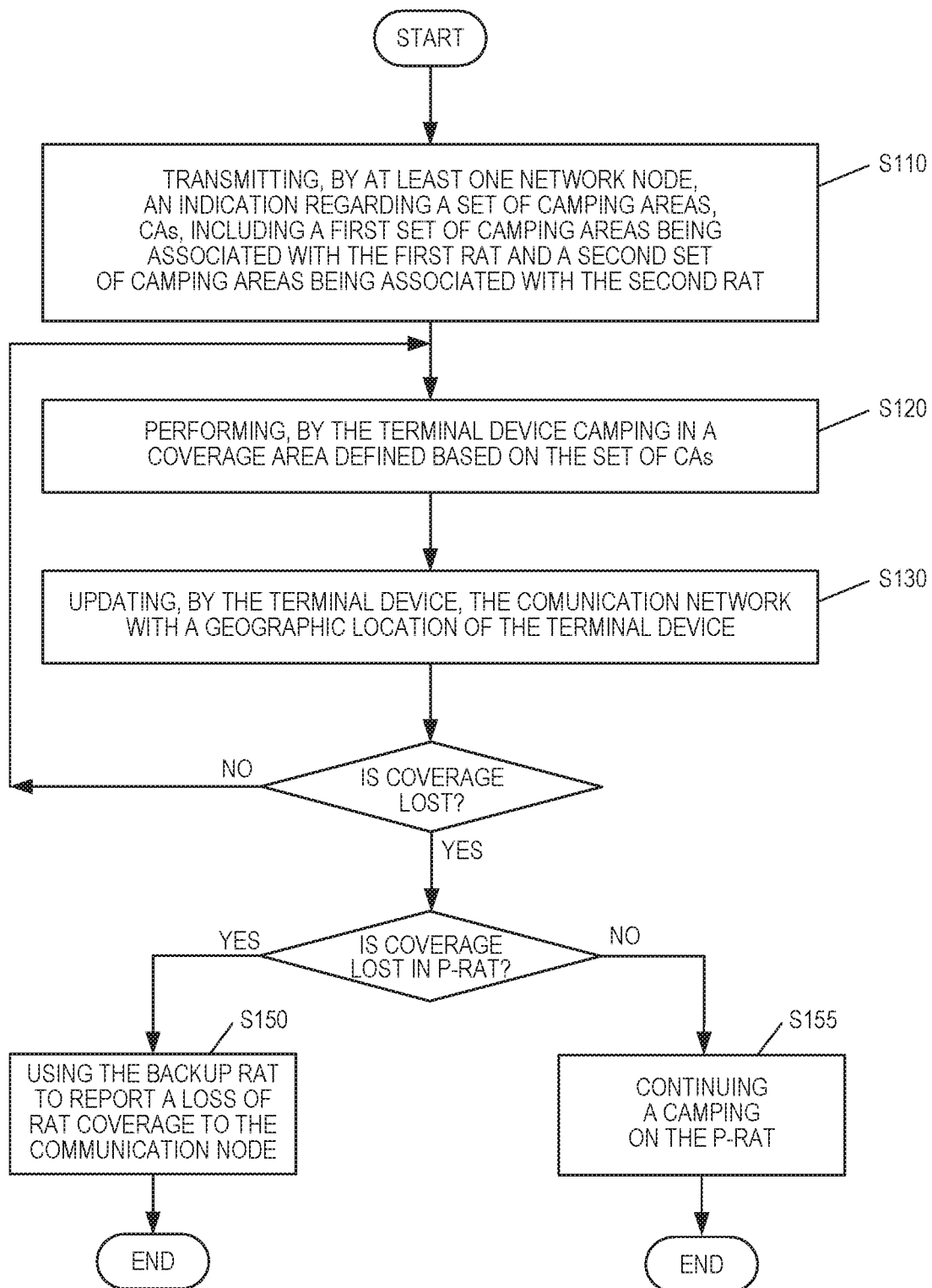
FIG. 10 is a schematic flow diagram illustrating another embodiment of a method for the coordinating of simultaneous multi-RAT camping.

FIG. 10 illustrates a flow diagram of a method in a wireless communication network according to another embodiment. Further to the steps S110, S120, and S130 (and optionally also including step S140 as described above), the terminal device 10 continuously determines whether a RAT coverage is lost. When coverage is not lost in any of RAT1 and RAT2, the terminal device continues dual camping as described above in step S120. When, on the other hand, it is determined by the terminal device 10 that a coverage, as defined by the current set of CAs, is lost and the terminal device moves out of the coverage area as defined by the current set of CAs, then the terminal device may determine in which of the different RATs the coverage is lost.

If the coverage is, for example, lost for the priority RAT, then the terminal device proceeds with step S150 of FIG. 10 to report a loss of RAT coverage, here loss of priority RAT coverage, one or both of to the communication nodes 301, 302. Based on the current geographic location of the UE in the RAT, which is used for the reporting, new CA(s) for the lost RAT (priority RAT) and/or new CA(s) for the RAT (backup RAT) the UE is using for reporting may be assigned in the core network and indicated to the terminal device. If the coverage is, on the other hand, lost (only) for the backup RAT, then the terminal device proceeds with step S155 of FIG. 10 to continue a camping on the priority RAT, and may additionally attempt to first try to access another carrier of the same (lost) RAT, e.g. in a lower frequency with likely better propagation conditions.

Figure 11:
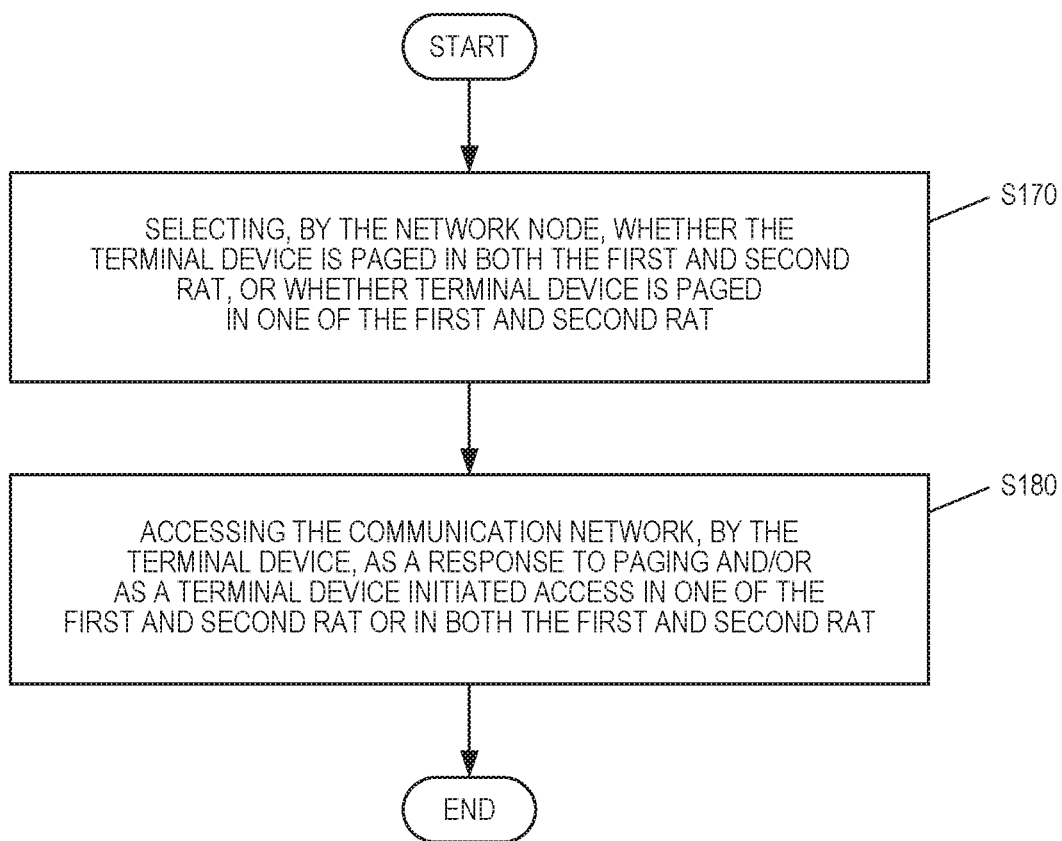
FIG. 11 is a schematic flow diagram illustrating another embodiment of a method for the coordinating of simultaneous multi-RAT camping.

FIG. 11 illustrates a flow diagram of a method in a wireless communication network according to another embodiment. According to step S170 of FIG. 11, a decision is made, for example by a radio access network node 30 in which both RAT1 and RAT2 are implemented (co-located) or a core network node, whether the terminal device 10 is paged in both of the first and second RAT, or whether the terminal device 10 is paged in only one of the first RAT and the second RAT. Paging over both RATs may maximize the chance that the UE receives a page (e.g., within a given timeframe). Paging over only one RAT, optionally followed by paging in the other RAT, may minimize page signaling. Further, depending on the load conditions in the different RATs, it may be selected to first page in the priority RAT (P-RAT) and to subsequently page in the backup RAT (B-RAT) only if there is no response. Accordingly, the UE may be configured to monitor the paging channel(s) of one or more RAT(s), e.g. the paging channel of one RAT at a time, or to monitor the paging channels of both RAT1 and RAT2. Alternatively, the UE may be configured to monitor the paging channel(s) only the priority RAT or both the priority RAT and the backup RAT.

Here, paging is usually initiated from the core network node 50. In LTE the MME sends a S1AP Paging message to each eNB 301, 302 to participate in the paging and this triggers the eNBs 301, 302 to send an RRC Paging message to the terminal device (UE) 10. A paging message is sent on the PDSCH just like any other higher layer control plane message or user plane message. A difference from other messages is that it is addressed to a certain RNTI, the Paging RNTI (P-RNTI), which all UEs can listen for on the PDCCH. The actual RRC Paging message on the PDSCH includes an identifier in a paging record indicating which UE the page is directed to. Paging information for the UE is being carried on the PDSCH in the resource blocks indicated by the PDCCH. To respond to the paging the terminal device (UE) may perform a random access procedure and may send a NAS Service Request message to be forwarded by the eNB to the MME.

According to step S180 of FIG. 11, the terminal device 10 accesses the communication network via the radio network node (eNB) 301, 302, either as a response to the paging command in step S170 or as a terminal device initiated access, in one of the first and second RAT, in particular the P-RAT, or in both of the RATs. Here, the steps S170 and S180 of FIG. 11 may be performed in conjunction with the steps S110, S120, S130, S140, S150, and S155 described above.

The following describes additional aspects with regard to the above illustrated first, second, and third mechanisms, according to preferred embodiments.

According to a preferred embodiment being related to the first mechanism and a first step of the first mechanism, a network node of the communication network configures the UE via dedicated signaling or via common signaling (e.g. system information via common channel(s)) with a list or set of lists wherein a list contains one or more CA(s) (or codes/identifiers assigned to the signaled CA(s)). A list may be common, i.e. both RATs utilize the same CA(s), or it may be provided per RAT, e.g. one list for LTE and another list for NR.

Such a list may contain one or more CA(s) (CA-RAT1, CA-RAT2) covering both RATs to which the UE is assigned so that the UE does not need to provide a CA Update while it is moving within the nodes/cells which belong to the CA(s) assigned to the UE. With the first mechanism this configuration is relaxed in the sense that the UE will do a CA Update when it enters a new coverage area or leaves the assigned CA(s) in both RATs, but not as long as it remains in the coverage of a CA in the list of at least one of the RATs. This list is henceforth referred to as "CA list" or "list of CAs" or "list of CA(s)". This list may be mandatory.

Such a list may also contain one or more CA(s) for one or more RAT(s) to which the UE is allowed to register. This list is henceforth referred to as "whitelist". This list may be optional.

Such a list may also contain one or more not allowed CA(s) for one or more RAT(s) to which the UE is not allowed to register. This list is henceforth referred to as "blacklist". This list may also be optional.

In addition, each CA signaled in such a CA list may have a priority indication. This means that the network may indicate to the UE in which CA the UE should preferably choose to access the network, e.g. in case the UE needs to access the network for some reason, in a situation where the UE is in a location (e.g. cell/node) which belongs to multiple CAs. This could be also applied in the case where overlapping CAs within the same RAT are used, i.e. the same cell/node belongs to more than one CA in the same RAT and broadcasts the corresponding identities/codes. It may also be applied to steer the UE to a preferred RAT which may be area/location dependent, when the UE is covered by a CA in each RAT, e.g. one CA in LTE and one CA in NR.

Similarly, each CA signaled in the whitelist may have a priority indication. These priority indications have a similar purpose as the optional priority indications in the CA list and are used in a similar way. A difference is that in the case of the whitelist, the priority indications are means to steer in which CA a UE should register, e.g. perform CA Update, when this is needed.

The network may optionally replace the priority indications in a CA list or a whitelist with a RAT preference indication, so that the UE always prioritizes one of the RATs, when there is a choice.

The network may also configure the UE with paging information via dedicated signaling or via common signaling (e.g. system information) or using a combination of both. This information may contain at least one of the following:

DRX configuration (possibly including input parameter(s) for a paging occasion algorithm), one or more paging channels (i.e. for one RAT or both RATs) and related paging information.

The network may also configure the UE via dedicated signaling or via common signaling (e.g. system information) with the CA mechanism (i.e. first mechanism in this example) which the UE should apply.

When, according to a second step of the first mechanism, the UE camps in an area, it monitors the relevant control signaling in at least one of the RATs and reads the CAI in the area, or CAIs in case the UE monitors both RATs when performing dual camping. The CAI of an area is signaled by the network via common signaling.

According to a third step of the first mechanism, the UE monitors the paging channel(s) in at least one of the RATs, as configured by the network. It is noted that this can also be seen as an inherent aspect of camping, in which case this step is redundant, since it is implicitly included in the preceding step.

According to a fourth step of the first mechanism, the UE applies the configured CA mechanism. In this case, the first mechanism indicates that the UE should perform a CA Update when it no longer detects any CA matching any of the assigned CA(s). In other words, if a CA list is provided for each RAT, no match should be found in any of the assigned CA lists for any of the RATs to trigger the UE to perform a CA Update. This CA Update may be a combined update for both RATs, i.e. a combined Tracking Area Update in LTE and corresponding update in NR.

The above described first mechanism may therefore reduce signaling since the CA update is only performed when the UE no longer detects any CA matching any of the assigned CA(s).

The following describes a preferred embodiment being related to the second mechanism.

According to a first step of the second mechanism, the network configures the UE via dedicated signaling or via common signaling (e.g. system information) with a list or set of lists wherein a list contains one or more CA(s) (or codes/identifiers assigned to the signaled CA(s)). A list may be common i.e. both RATs utilize the same CA(s), or it may be provided per RAT, i.e. one list for LTE and another list for NR.

A list may contain one or more CA(s) (covering both RATs) to which the UE is assigned so that the UE does not need to provide a CA Update while it is moving within the nodes/cells which belong to the CA(s) assigned to the UE. According to the second mechanism this configuration is applied per RAT, which means that the UE will do a CA Update when it leaves the assigned CA(s) in any of the RATs. That is, if it leaves the CA(s) in the list in one of the RATs (e.g. CA-RAT1) and enters a CA that is not included in the list, it performs a CA Update, even if it is still in the coverage of a CA in the list (e.g. CA-RAT2) of the other RAT. In accordance with the above defined terminology, such a list is a CA list. This list may be mandatory.

A list may also contain one or more CA(s) (for one or more RAT(s)) to which the UE is allowed to register, i.e. a whitelist. This list may be optional. A list may also contain one or more not allowed CA(s) (for one or more RAT(s)) to which the UE is not allowed to register, i.e. a blacklist.

The network may also configure the UE with a special "out of RAT coverage" capability/behavior governing the UE's behavior in case it loses coverage of one of the two different RATs, for example when the UE loses coverage of RAT1. When this happens the UE's behavior may (according to the configuration) be either of the following:

a) The UE uses the other RAT, i.e. RAT2 in the above example, to report the loss of RAT coverage to the network. The network may or may not configure the UE with new CA(s) for the lost RAT (i.e. RAT1), e.g. based on the UE's location in the RAT used for the reporting. The network may also take the opportunity to configure the UE with new CA(s) for the RAT the UE is using for reporting, i.e. RAT2. That is, the network may make this a single RAT CA update (for RAT1) or a combined CA update (for both RAT1 and RAT2), or none of them.

b) The UE does nothing, except to keep camping on the still available RAT, i.e. RAT2 in the above example.

The UE can also be configured with different carriers of the same RAT so that it can first try to access another carrier of the same RAT, e.g. in a lower frequency likely with better propagation conditions.

In addition, each signaled CA may have a priority indication (or a "summarizing" RAT preference indication as explained above in the first mechanism), which would serve the same purpose as in the first mechanism.

The network may also configure the UE with paging information via dedicated signaling or via common signaling (e.g. system information) or using a combination of both. This information may contain at least one of the following: DRX configuration (possibly including input parameter(s) for a paging occasion algorithm), at least one paging channel for each RAT of the different RATs (i.e. the UE is configured to monitor the paging channels of both RATs) and related paging information.

The network may also configure the UE via dedicated signaling or via common signaling (e.g. system information) with the CA mechanism (i.e. the second mechanism in this embodiment) which the UE should apply.

When, according to a second step of the second mechanism, the UE performs dual camping in an area, it monitors the relevant control signaling in both RATs and reads the CAIs of both of the different RATs in the area. The CAI of an area is signaled by the network via common signaling.

According to a third step of the second mechanism, the UE monitors the paging channels of both RATs. In this solution the network can select if it wants to page the UE in both RATs to maximize the chance that the UE should receive a page (within a given timeframe) or if it should only page in one of the RATs to minimize the page signaling (optionally followed by paging in the other RAT in case the UE does not respond to the page in the first RAT). The network may also take into account the load in the different RATs so that the UE would be paged and respond in the RAT with a lower load. In the case the network has to page many dual camping UEs, it may also distribute the load over both RATs, i.e. paging some UEs in one RAT and other UEs in the other RAT. This could be seen as speeding up multi-RAT load balancing and could be configured in scenarios where high load is occurring.

According to a fourth step of the second mechanism, the UE applies the configured CA mechanism. Here, the second mechanism indicates that the UE should perform a CA Update when it no longer detects any CA matching any of the assigned CA(s) in one of the RATs, i.e. either in RAT1 or in RAT2. In other words, if a CA list is provided for each RAT, as soon as no match is found in the list of one of the RATs, because it has entered a CA that is not in the list, for example in CAT-RAT1, the UE should perform CA Update, even if it is still covered by a CA present in the list of the other RAT, e.g. CAT-RAT2. Upon a CA Update, the network should assign a new CA list, or set of lists (as described above in step [0093], to the UE. The network may assign new CA(s) to the UE for both (all) RATs, even though the CA Update was triggered because the UE left the assigned CA(s) of only one of the RATs. This may be preferable, in case the UE is assigned multiple CAs to move around in in the other RAT and the previously assigned CAs are no longer optimal. This CA Update may be a combined update for both RATs, i.e. a combined Tracking Area Update in LTE and corresponding update in NR.

Furthermore, if the UE loses coverage of one of the RATs, it follows the out of RAT coverage behavior configuration (if any), as described above. That is, it either uses the still available RAT to report the loss of coverage of one of the RATs or keeps camping on the still available RAT without informing the network. In the former case, as described above, the network may configure the UE with new CA(s) in either or both of the RATs (or none of them).

As described above, the second mechanism combines the benefits of maximized reliability and either a minimized paging delay or a minimized paging signaling.

The following describes a preferred embodiment being related to the third mechanism.

The third mechanism may be considered as a hybrid mechanism between the first and second mechanisms described above, where one of the RATs, e.g. RAT1, is treated in accordance with the first mechanism and the other RAT, e.g. RAT2, is treated in accordance with the second mechanism.

Here, the network may classify the RATs as a priority RAT (P-RAT) and a backup RAT (B-RAT). In a scenario with more than two RATs, this can be generalized to a set of priority RATs (possibly with different priorities) and a set of backup RATs.) The P-RAT is in principle treated in accordance with the second mechanism, while the B-RAT in principle is treated in accordance with the first mechanism. The UE is configured to always prefer the P-RAT when it is available and to only use (e.g. camp on) the B-RAT when there is no coverage of the P-RAT.

According to a first step of the third mechanism, the network configures the UE via dedicated signaling or via common signaling (e.g. system information) with a list or set of lists wherein a list contains one or more CA(s) (or codes/identifiers assigned to the signaled CA(s)). A list may be common, i.e. both RATs utilize the same CA(s), or it may be provided per RAT, i.e. one list for LTE and another list for NR.

A list may contain one or more CA(s) (covering both RATs) to which the UE is assigned so that the UE does not need to provide a CA Update while it is moving within the nodes/cells which belong to the CA(s) assigned to the UE. Within the third mechanism this configuration is applied per RAT and the configuration is different for the P-RAT than for the B-RAT. To this end, if the UE leaves the assigned CA(s) in the P-RAT, e.g. CA-RAT1, and enters a CA that is not in the list, it performs a CA Update, even if it is still in the coverage of a CA in the list of the B-RAT, i.e. CA-RAT2 in this example. On the other hand, if the UE leaves the assigned CA(s) in the B-RAT, CA-RAT2 in this example, and enters a CA that is not in the list (which the UE may not even notice because it may camp only on the P-RAT), it does not perform any CA update. In accordance with the above defined terminology, such a list is a CA list. This list may be mandatory.

A list may also contain one or more CA(s) (for one or more RAT(s)) to which the UE is allowed to register, i.e. a whitelist. This list may be optional. A list may also contain one or more not allowed CA(s) (for one or more RAT(s)) to which the UE is not allowed to register, i.e. a blacklist as described above.

Here, the UE's configured out of coverage behavior in accordance with the third mechanism is as follows:

If the UE loses coverage of the P-RAT, it camps on the B-RAT and uses it to report to the network that it has lost coverage of the P-RAT. If the UE loses coverage of the B-RAT, it does nothing. It is noted that the UE may not even notice if it loses coverage of the B-RAT, because it may be camping only on the P-RAT. The network may (or may not) configure the UE with new CA(s) for the (lost) P-RAT (based on the UE's location in the B-RAT). The network may also take the opportunity to configure the UE with new CA(s) for the B-RAT. That is, the network may make this a single RAT CA update or a combined CA update (or none of them).

The network may also configure the UE with paging information via dedicated signaling or via common signaling (e.g. system information) or using a combination of both. This information may contain at least one of the following: DRX configuration (possibly including input parameter(s) for a paging occasion algorithm), at least one paging channel for each RAT (i.e. the UE is configured to monitor the paging channels of both RATs) and related paging information. The network may also configure the UE via dedicated signaling or via common signaling (e.g. system information) with the CA mechanism (i.e. the third mechanism in this example) which the UE should apply.

When, according to a second step of the third mechanism, the UE camps in an area, it monitors the relevant control signaling in at least the P-RAT and reads the CAIs of at least the P-RAT in the area. The CAI of an area is signaled by the network via common signaling.

According to a third step of the third mechanism, the UE monitors the paging channels of at least the P-RAT. In this solution the network can select if it wants to page the UE in both RATs to maximize the chance that the UE should receive a page (within a given timeframe) or if it should only page in the P-RAT to minimize the page signaling. It is the choice of the network operator to configure the network's paging behavior, but for the third mechanism, it is preferred that the network first only pages the UE in the P-RAT and pages in the B-RAT only if not response is received for the page in the P-RAT. This recommendation can be motivated by the configuration that the UE monitors paging in the P-RAT as long as it is available and the situation that the UE monitors only the B-RAT when the P-RAT is lost and then the UE should (as described above) report this loss of P-RAT coverage to the network. An operator may however still choose to configure the network to page in both RATs immediately (possibly dependent on the urgency of the downlink data to be delivered), because even if a UE has P-RAT coverage, it may fail to receive the paging message, e.g. due to a very temporary fading dip.

According to a fourth step of the third mechanism, the UE applies the configured CA mechanism. In this case, the third mechanism indicates that the UE should perform a CA Update when it no longer detects any CA matching any of the assigned CA(s) in the P-RAT, i.e. when it has entered a CA in the P-RAT which is not included in the CA list. Upon a CA Update, the network should assign a new CA list, or set of lists (as described above in step [0093], to the UE. The network may assign new CA(s) to the UE for both the P-RAT and the B-RAT, even though the CA Update was triggered because the UE left the assigned CA(s) of the P-RAT. This may be preferable, in case the network determines that the UE has left its assigned CA(s) in the B-RAT or if the network has assigned multiple CAs to move around in in the B-RAT and the previously assigned CAs are no longer optimal. This CA Update may be a combined update for both RATs, i.e. a combined Tracking Area Update in LTE and corresponding update in NR.

If the UE loses coverage of the P-RAT, it starts camping on the B-RAT and uses the B-RAT to report the loss of P-RAT coverage to the network. If the UE, when starting to camp on the B-RAT, detects that it has entered a CA in the B-RAT that is not included in the CA list, the report of P-RAT coverage loss is combined with a CA update for the B-RAT. As described above, upon receiving the report of loss of P-RAT coverage, the network may configure the UE with new CA(s) in either or both of the RATs (or none of them). If the report of loss of P-RAT coverage is combined with a CA update for the B-RAT, the network configures the UE with new CA(s) for the B-RAT and may or may not also configure the UE with new CA(s) for the P-RAT.

The abovementioned aspects focus on the monitoring aspects of the UE in the case of multi-RAT camping. Another relevant aspect is how the UE camping on both RATs should access the system when needed, either as a response to paging and/or as a UE initiated access. Especially in the case the UE is configured to monitor multiple channels, such as the paging channel, the UE can be configured to respond when it receives pages in multiple RATs. For instance, the UE may be configured to respond in the higher priority RAT, the one with the strongest radio conditions or both simultaneously. Similarly for the UE initiated access, the UE can be configured to access a higher priority RAT, the one with the strongest radio conditions or both simultaneously.

In addition, it is noted that even though the embodiments have been described with the combination of LTE and NR, as the first and second RATs, as the main scenario in mind, the present concept may easily be extended to more than two RATs.

In addition, it is also noted that the described embodiments have focused on the multi-RAT camping and extensively use that term. However, the present concept is also applicable for the case the UE camps on multiple carriers (sometimes called RAT or air interface variant) of a single RAT. These different carriers can for example have different numerologies or even be associated with multiple cells where one can be a macro cell in lower frequencies and a small cell in higher frequencies, outdoor/indoor or other combinations of these.

The above respective modules may be implemented by a processing unit that include one or a plurality of processors, a microprocessor or other processing logic that interprets and executes instructions stored in a main memory, i.e. memory modules 16, 361, 362, and 56. The main memory may include a RAM or other type of dynamic storage device that may store information and instructions for execution by the respective modules/units. For example, the radio transceiver modules 12, 321 and 322 and the corresponding processing module 12, 341 and 342 as well as the transceiver module 52 and the corresponding processing module 54 discussed above with respect to FIG. 10 may be realized by the processing unit/processor. The ROM may include a ROM device or another type of static storage device that may store static information and instructions for use by the processing unit.

As mentioned above, the radio access network nodes (base stations) 301 and 302 as well as the terminal device 10 and the (core or anchor) network node 50 may perform certain operations or processes (acquiring, identifying, transmitting, predicting, decision making, etc.) described herein. These operations may be performed in response to the processing unit/processor executing software instructions contained in a computer-readable medium, such as the main memory, ROM and/or storage device. A computer-readable medium may be defined as a physical or a logical memory device. For example, a logical memory device may include memories within a single physical memory device or distributed across multiple physical memory devices. Each of the main memory, ROM and storage device may include computer-readable media with instructions as program code. The software instructions may be read into the main memory for another computer-readable medium, such as a storage device or from another device via the communication interface.

Further, the software instructions contained in the main memory may cause the processing unit(s) including a data processor, when executed on the processing unit, to cause the data processor to perform operations or processes described herein. Alternatively, hard-wired circuitry may be used in place or on in combination with the software instructions to implement processes and/or operations described herein. Thus, implementations described herein are not limited to any specific combination of hardware and software.

The physical entities according to the different embodiments of the invention, including the elements, units, modules, nodes and systems may comprise or store computer programs including software instructions such that, when the computer programs are executed on the physical entities, steps and operations according to the embodiments of the invention are carried out, i.e. cause data processing means to carry out the operations. In particular, embodiments of the invention also relate to computer programs for carrying out the operations/steps according to the embodiments of the invention, and to any computer-readable medium storing the computer programs for carrying out the above-mentioned methods.

Where the term module is used, no restrictions are made regarding how distributed these elements may be and regarding how gathered these elements may be. That is, the constituent elements/modules/units of the base stations 301 and 302 as well as the terminal device 10 and the network node 50 may be distributed in different software and hardware components or other devices for bringing about the intended function. A plurality of distinct elements/modules may also be gathered for providing the intended functionality. For example, the elements/modules/functions of the UE/nodes may be realized by a microprocessor and a memory similar to the above node including a bus, a processing unit, a main memory, ROM, etc. The microprocessor may be programmed such that the above-mentioned operations, which may be stored as instructions in the memory, are carried out.

Further, the elements/modules/units of the apparatus may be implemented in hardware, software, Field Programmable Gate Arrays (FPGAs), application-specific integrated circuits (ASICs), firmware or the like.

It will be apparent to those skilled in the art that various modifications and variations can be made in the entities and methods of this invention as well as in the construction of this invention without departing from the scope or spirit of the invention.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Moreover, other implementations of the invention will be apparent to those skilled in the art from consideration of the specification and practice of the invention disclosed herein. It is intended that the specification and the examples be considered as exemplary only, wherein abbreviations used in the above examples are listed below. To this end, it is to be understood that inventive aspects lie in less than all features of a single foregoing disclosed implementation or configuration. Thus, the true scope and spirit of the invention is indicated by the following claims.

The invention has been described in relation to particular embodiments and examples which are intended in all aspects to be illustrative rather than restrictive. Those skilled in the art will appreciate that many different combinations of hardware, software and/or firmware will be suitable for practicing the present invention.

Abbreviations

3GPP 3$^{rd}$ Generation Partnership Project
5G 5$^{th}$ Generation
AI Air Interface
B-RAT Backup RAT
CA Camping Area
CAI Camping Area Identifier
CDMA Code Division Multiple Access
CN Core Network
CP Control Plane
DRX Discontinuous Reception
ECM EPS Connection Management
eNB Evolved NodeB
EPS Evolved Packet System
E-UTRAN Evolved UTRAN
EV-DO Evolution-Data Optimized
GPRS General Packet Radio Service
GSM Global System for Mobile communication
IE Information Element
LTE Long Term Evolution
MAC Medium Access Control
MeNB Master eNB
MME Mobility Management Entity
NAS Non Access Stratum
NR New Radio (3GPP's name for the 5G RAN to be standardized.)
NW Network
PCI Physical Cell Identity
PDCCH Physical Downlink Control Channel
PDCP Packet Data Convergence Protocol
PDU Packet Data Unit
PHY Physical layer
P-RAT Priority RAT
RACH Random Access Channel
RAN Radio Access Network
RAT Radio Access Technology
RLC Radio Link Control
RRC Radio Resource Control
S1* S1 interface evolved for 5G, i.e. the interface between a 5G RAN (NR or evolved E-UTRAN) and a 5G core network.

The invention claimed is:

1. A method implemented by a terminal device configured to operate using two or more different radio access technologies, the method comprising:
receiving information from the network indicating a first set of camping areas (CAs) associated with a first RAT serving and a second set of (CAs) associated with the second RAT;
while in a coverage area defined by the first and second sets of camping areas (CAs), camping on at least one of the first and second RATs,
updating a geographic location of the terminal device when the terminal device leaves the coverage area defined by the first and second sets of CAs; and
refraining from updating the geographic location of the terminal device when the terminal device leaves a coverage area defined by one of the first and second sets of CAs but remains in a coverage area defined by the other of the first and second set of CAs.

2. The method of claim 1, wherein the terminal device refrains from updating the geographic location of the terminal device when the terminal device leaves a coverage area defined by the second set of CAs but remains in a coverage area defined by the first set of CAs.

3. The method of claim 2, wherein the first RAT comprises a priority RAT and further comprising:
updating a geographic location of the terminal device when the terminal device leaves a coverage defined by the first set of CAs.

4. The method of claim 1, wherein updating the communication network with a geographic location of the terminal device is an update for the first RAT and/or the second RAT.

5. The method of claim 1 further comprising, when the terminal device loses coverage of the first RAT:
using the second RAT to report a loss of RAT coverage to the communication network; or
camping or continue camping on the second RAT.

6. The method of claim 1, wherein the indication comprises a priority indication indicating a preferred CA the terminal device should select to access the network, a preferred RAT the terminal device should select to access the network, or both.

7. The method of claim 5, wherein the priority indication is a RAT preference indication.

8. The method of claim 1, further comprising monitoring paging channels in both the first RAT and second RAT, or in one of the first RAT and second RAT.

9. The method of claim 1, further comprising accessing the wireless communication network in response to paging and/or as a terminal device initiated access in the first RAT, or in both the first RAT and second RAT.

10. The method of claim 1, further comprising receiving a control instruction that configures the terminal device to apply the first, second, or third mechanism.

11. A method implemented by a network node in a wireless communication network providing radio access for a terminal device via at least a first and second type of wireless radio accesses operating with different radio access technologies, the method comprising:
transmitting, to the terminal device, information indicating a set of camping areas (CAs) associated with the RAT serving and a second set of camping areas being associated with the second RAT serving as a backup RAT;
transmitting a control instruction to configure the terminal device to:
update a geographic location of the terminal device when the terminal device leaves the coverage area defined by the first and second sets of CAs; and
refrain from updating the geographic location of the terminal device when the terminal device leaves a coverage area defined by one of the first and second sets of CAs but remains in a coverage area defined by the other of the first and second set of CAs.

12. The method of claim 11, wherein the control instruction configures the terminal device to refrain from updating the geographic location of the terminal device when the terminal device leaves a coverage area defined by the second set of CAs but remains in a coverage area defined by the first set of CAs.

13. The method of claim 12, wherein the first RAT comprises a priority RAT and the control instruction configures the terminal device to update a geographic location of the terminal device when the terminal device leaves a coverage defined by the first set of CAs.

14. The method of claim 10, wherein the information further comprises a priority indication indicating a preferred CA the terminal device should select to access the network, a preferred RAT the terminal device should select to access the network, or both.

15. The method of claim 14, wherein the priority indication is a RAT preference indication.

16. A terminal device accessible via at least first and second type of wireless radio accesses operating with different radio access technologies, comprising:
a radio transceiver configured to communicate with a network node in a wireless communication network;
a processing circuit operatively connected to the radio transceiver and configured to:
receive information from the network indicating a first set of camping areas (CAs) associated with a first RAT serving and a second set of (CAs) associated with the second RAT;
while in a coverage area defined by the first and second sets of camping areas (CAs), camp on at least one of the first and second RATs,
update a geographic location of the terminal device when the terminal device leaves the coverage area defined by the first and second sets of CAs; and
refrain from updating the geographic location of the terminal device when the terminal device leaves a coverage area defined by one of the first and second sets of CAs but remains in a coverage area defined by the other of the first and second set of CAs.

17. The terminal device of claim 16, wherein the processing circuit is further configured to refrain from updating the geographic location of the terminal device when the terminal device leaves a coverage area defined by the second set of CAs but remains in a coverage area defined by the first set of CAs.

18. The terminal device of claim 17, wherein the first RAT comprises a priority RAT and wherein the processing circuit is further configured to update a geographic location of the terminal device when the terminal device leaves a coverage defined by the first set of CAs.

19. A network node in a wireless communication network providing radio access for a terminal device via at least a first and second type of wireless radio accesses operating with different radio access technologies, the network node comprising:
a radio transceiver configured to communicate with a terminal device;
a processing circuit operatively connected to the radio transceiver and configured to:
transmit, to the terminal device, information indicating a set of camping areas (CAs) associated with the RAT serving and a second set of camping areas being associated with the second RAT serving as a backup RAT;
transmit a control instruction to configure the terminal device to:
update a geographic location of the terminal device when the terminal device leaves the coverage area defined by the first and second sets of CAs; and
refrain from updating the geographic location of the terminal device when the terminal device leaves a coverage area defined by one of the first and second sets of CAs but remains in a coverage area defined by the other of the first and second set of CAs.

20. The network node of claim 19, wherein the control instruction configures the terminal device to refrain from updating the geographic location of the terminal device when the terminal device leaves a coverage area defined by the second set of CAs but remains in a coverage area defined by the first set of CAs.

21. The network node of claim 20, wherein the first RAT comprises a priority RAT and the control instruction configures the terminal device to update a geographic location of the terminal device when the terminal device leaves a coverage defined by the first set of CAs.

* * * * *